US006464610B1

(12) United States Patent
Hisano et al.

(10) Patent No.: US 6,464,610 B1
(45) Date of Patent: Oct. 15, 2002

(54) HYDRAULIC PRESSURE CONTROL APPARATUS FOR AUTOMATIC TRANSMISSION

(75) Inventors: Takayuki Hisano, Anjo (JP); Toshiyuki Mae, Anjo (JP); Kazumasa Tsukamoto, Anjo (JP); Akitomo Suzuki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/527,847

(22) Filed: Mar. 17, 2000

(30) Foreign Application Priority Data

Mar. 23, 1999 (JP) .......................................... 11-078639

(51) Int. Cl.⁷ ............................................. F16H 31/00
(52) U.S. Cl. ...................................... 475/119; 475/121
(58) Field of Search ............................ 475/119, 121, 475/122; 477/906

(56) References Cited

U.S. PATENT DOCUMENTS

| 3,754,482 A | * | 8/1973 | Sanders et al. ............. 475/120 |
| 4,307,631 A | * | 12/1981 | Iwanaga et al. ......... 477/906 X |
| 5,014,577 A | * | 5/1991 | Takada et al. .......... 477/906 X |
| 5,106,352 A | * | 4/1992 | Lepelletier ................. 475/280 |
| 5,334,114 A | * | 8/1994 | Ando et al. .................. 475/119 |
| 5,509,868 A | * | 4/1996 | Eaton .................... 477/906 X |
| 5,778,330 A | * | 7/1998 | McKee .................. 477/906 X |
| 5,919,108 A |   | 7/1999 | Takagi |
| 5,957,800 A | * | 9/1999 | Oba et al. .................... 475/119 |

FOREIGN PATENT DOCUMENTS

| DE | 197 46 681 A1 | 4/1998 |
| EP | 0 434 525 A | 6/1991 |
| EP | 0 694 713 A2 | 1/1996 |
| EP | 1 033 510 A1 | 9/2000 |
| EP | 1 113 196 A2 | 7/2001 |
| EP | 1 113 197 A2 | 7/2001 |
| JP | 4-219553 | 8/1992 |

* cited by examiner

Primary Examiner—Charles A Marmor
Assistant Examiner—Ha Ho
(74) Attorney, Agent, or Firm—Oliff & Berridge, PLC

(57) ABSTRACT

A structure in which a hydraulic-pressure control applied pressure for controlling each engagement element of an automatic transmission is realized by using an electric signal such that combinations of engagement which encounter a tie-up in case of a failure of the signal lead to interlocking are inhibited to prevent deterioration in the durability of each engagement element. An automatic transmission incorporates a planetary gear transmission mechanism using selective engagement of at least five engagement elements to realize six gear ratios, and a hydraulic-pressure control apparatus for controlling the engagement elements of the transmission mechanism. Valves are provided which inhibit combinations of engagement of two or more engagement elements of the five engagement elements for interlocking the transmission mechanism.

36 Claims, 21 Drawing Sheets

FIG. 2

|  | C-1 | C-2 | C-3 | B-1 | B-2 | B-3 | F-1 | F-2 |
|---|---|---|---|---|---|---|---|---|
| P |  |  |  |  |  |  |  |  |
| R |  |  | ○ |  |  | ○ |  |  |
| N |  |  |  |  |  |  |  |  |
| FIRST SPEED | ○ |  |  |  |  |  |  | ○ |
| FIRST SPEED (E/G BRAKE) | ○ |  |  |  |  | ○ |  |  |
| SECOND SPEED | ○ |  |  |  | ○ |  | ○ |  |
| SECOND SPEED (E/G BRAKE) | ○ |  |  | ○ | ● |  |  |  |
| THIRD SPEED | ○ |  | ○ |  | ● |  |  |  |
| FOURTH SPEED | ○ | ○ |  |  | ● |  |  |  |
| FIFTH SPEED |  | ○ | ○ |  | ● |  |  |  |
| SIXTH SPEED |  | ○ |  | ○ | ● |  |  |  |
| EMERGENCY |  | ○ | ○ |  | ● |  |  |  |

○: ENGAGEMENT

BLANK:RELEASE

●:ENGAGEMENT (NO TRANSMISSION OF TORQUE)

FIG. 4

| | C-1 | C-2 | C-3 | B-1 | B-2 | B-3 | |
|---|---|---|---|---|---|---|---|
| ① | O | | | | | O | 1stEB |
| ② | O | | | | O | | 2nd |
| ③ | O | | | O | | | 2ndEB |
| ④ | O | | O | | | | 3rd |
| ⑤ | O | O | | | | | 4th |
| ⑥ | | O | O | | | | 5th |
| ⑦ | | O | | O | | | 6th |
| ⑧ | | O | | | O | | |
| ⑨ | | O | | | | O | |
| ⑩ | | | O | O | | | |
| ⑪ | | | O | | O | | |
| ⑫ | | | O | | | O | Rev |
| ⑬ | | | | O | O | | |
| ⑭ | | | | O | | O | |
| ⑮ | | | | | O | O | |

FIG. 5

| | C-1 | C-2 | C-3 | B-1 | B-2 | B-3 | |
|---|---|---|---|---|---|---|---|
| ① | O | O | O | | | | |
| ② | O | O | | O | | | |
| ③ | O | O | | | O | | 4th |
| ④ | O | O | | | | O | |
| ⑤ | O | | O | O | | | |
| ⑥ | O | | O | | O | | 3rd |
| ⑦ | O | | O | | | O | |
| ⑧ | O | | | O | O | | 2ndEB |
| ⑨ | O | | | O | | O | |
| ⑩ | O | | | | O | O | |
| ⑪ | | O | O | O | | | |
| ⑫ | | O | O | | O | | 5th |
| ⑬ | | O | O | | | O | |
| ⑭ | | O | | O | O | | 6th |
| ⑮ | | O | | O | | O | |
| ⑯ | | O | | | O | O | |
| ⑰ | | | O | O | O | | |
| ⑱ | | | O | O | | O | |
| ⑲ | | | O | | O | O | |
| ⑳ | | | | O | O | O | |

FIG. 6

| | C-1 | C-2 | C-3 | B-1 | B-2 | B-3 | |
|---|---|---|---|---|---|---|---|
| ⑨ | | O | | | | O | |
| ⑩ | | | | O | O | | |
| ⑫ | | | O | | | O | Rev |
| ⑭ | | | | O | | O | |
| ⑮ | | | | | O | O | |

FIG. 7

|   | C-1 | C-2 | C-3 | B-1 | B-2 | B-3 |   |
|---|-----|-----|-----|-----|-----|-----|---|
| ① | ○ | ○ | ○ |   |   |   |   |
| ② | ○ | ○ |   | ○ |   |   |   |

FIG. 12

|  | SLC1 | SLC2 | SLC3 | SLB1 | SLB2 | SLT | SL1 |
|---|---|---|---|---|---|---|---|
| P | ○ | ○ | ○ | ○ | ○ | ☆ | ○ |
| R | ○ | ○ | × | ○ | ○ | × | ○ |
| N | ○ | ○ | ○ | ○ | ○ | ☆ | ○ |
| FIRST SPEED | × | ○ | ○ | ○ | ○ | ☆ | ○ |
| FIRST SPEED (E/G BRAKE) | × | ○ | ○ | ○ | ○ | × | × |
| SECOND SPEED | × | ○ | ○ | ○ | × | ☆ | ○ |
| SECOND SPEED (E/G BRAKE) | × | ○ | ○ | × | × | ☆ | ○ |
| THIRD SPEED | × | ○ | × | ○ | × | ☆ | ○ |
| FOURTH SPEED | × | × | ○ | ○ | × | ☆ | ○ |
| FIFITH SPEED | ○ | × | × | ○ | × | ☆ | ○ |
| SIXTH SPEED | ○ | × | ○ | × | × | ☆ | ○ |
| EMERGENCY | × | × | × | × | × | × | × |

○: SOLENOID CURRENT ON
×: SOLENOID CURRENT OFF
☆: CHANGED IN ACCORDANCE WITH THROTTLE PRESSURE

FIG. 13

|  | C-1 | C-2 | C-3 | B-1 | B-2 | B-3 |
|---|---|---|---|---|---|---|
| #1 C1 CUTOFF VALVE | ● | ○ | ○ |  |  |  |
| #2 C1 CUTOFF VALVE | ● | ○ |  | ○ |  |  |
| B3 CUTOFF VALVE |  | ○ |  |  |  | ● |
|  |  |  | ○ |  |  | ● |
|  |  |  |  | ○ |  | ● |
|  |  |  |  |  | ○ | ● |
| C3 CUTOFF VALVE |  |  | ○ | ● |  |  |

●: FRICTIONAL ENGAGEMENT ELEMENTS WHICH ARE DRAINED

FIG. 20

|  | C-1 | C-2 | C-3 | B-1 | B-2 | B-3 |
|---|---|---|---|---|---|---|
| #1 C1 CUTOFF VALVE | ○ | ● | ○ |  |  |  |
| #2 C1 CUTOFF VALVE | ○ | ● |  | ○ |  |  |
| B3 CUTOFF VALVE |  | ○ |  |  |  | ● |
| |  |  | ○ |  |  | ● |
| |  |  |  | ○ |  | ● |
| |  |  |  |  | ○ | ● |
| C3 CUTOFF VALVE |  |  | ○ | ● |  |  |

FIG. 21
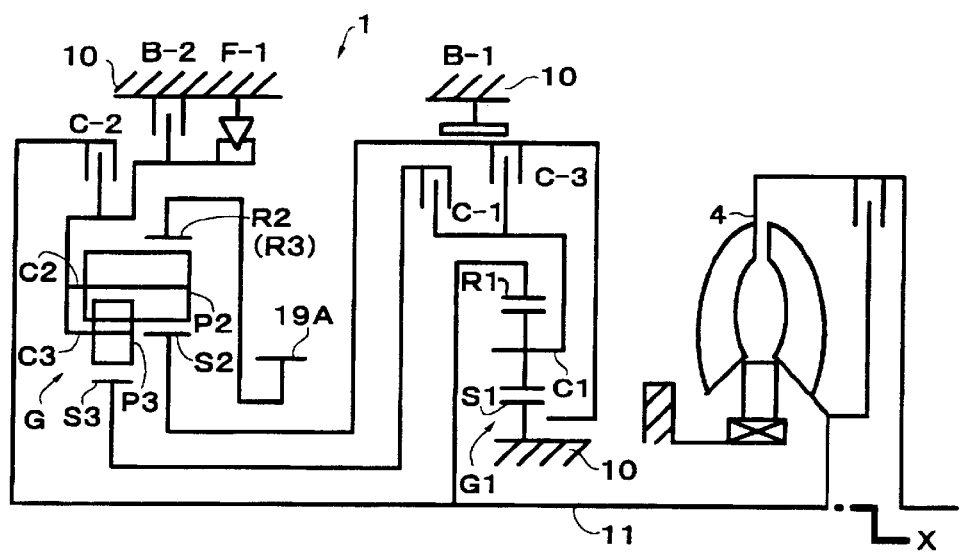
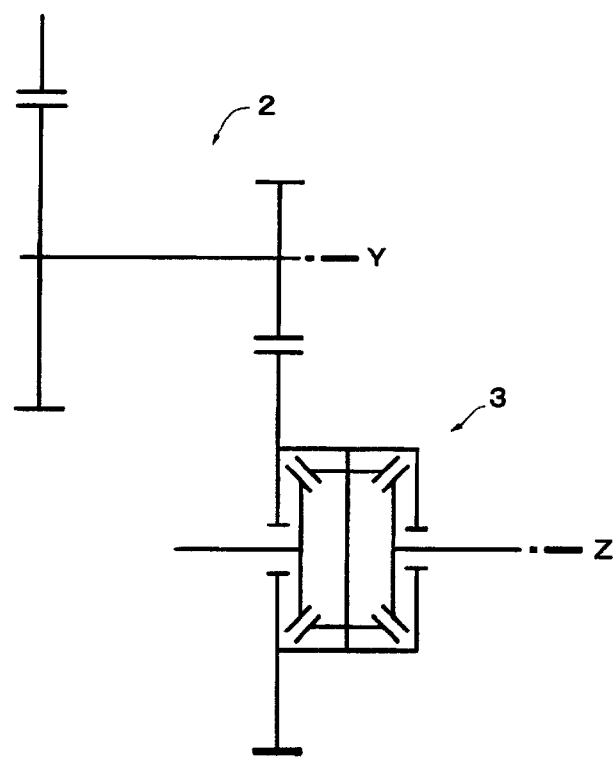

FIG. 22

|  | C-1 | C-2 | C-3 | B-1 | B-2 | F-1 |
|---|---|---|---|---|---|---|
| P |  |  |  |  |  |  |
| REV |  |  | O |  | O |  |
| N |  |  |  |  |  |  |
| 1ST | O |  |  |  | (O) | O |
| 2ND | O |  |  | O |  |  |
| 3RD | O |  | O |  |  |  |
| 4TH | O | O |  |  |  |  |
| 5TH |  | O | O |  |  |  |
| 6TH |  | O |  | O |  |  |

FIG. 23

|  | C-1 | C-2 | C-3 | B-1 | B-2 |  |
|---|---|---|---|---|---|---|
| ① | O |  |  |  | O | 1st |
| ② | O |  |  | O |  | 2nd |
| ③ | O |  | O |  |  | 3rd |
| ④ | O | O |  |  |  | 4th |
| ⑤ |  | O | O |  |  | 5th |
| ⑥ |  | O |  | O |  | 6th |
| ⑦ |  | O |  |  | O |  |
| ⑧ |  |  | O | O |  |  |
| ⑨ |  |  | O |  | O | Rev |
| ⑩ |  |  |  | O | O |  |

FIG. 24

|  | C-1 | C-2 | C-3 | B-1 | B-2 |  |
|---|---|---|---|---|---|---|
| ① | O | O | O |  |  |  |
| ② | O | O |  | O |  |  |
| ③ | O | O |  |  | O |  |
| ④ | O |  | O | O |  |  |
| ⑤ | O |  | O |  | O |  |
| ⑥ | O |  |  | O | O |  |
| ⑦ |  | O | O | O |  |  |
| ⑧ |  | O | O |  | O |  |
| ⑨ |  | O |  | O | O |  |
| ⑩ |  |  | O | O | O |  |

FIG. 25

|  | C-1 | C-2 | C-3 | B-1 | B-2 |  |
|---|---|---|---|---|---|---|
| ⑦ |  | O |  |  | O |  |
| ⑧ |  |  | O | O |  |  |
| ⑨ |  |  | O |  | O | Rev |
| ⑩ |  |  |  | O | O |  |

FIG. 26

|  | C-1 | C-2 | C-3 | B-1 | B-2 |  |
|---|---|---|---|---|---|---|
| ① | O | O | O |  |  |  |
| ② | O | O |  | O |  |  |

HYDRAULIC PRESSURE CONTROL APPARATUS FOR AUTOMATIC TRANSMISSION

BACKGROUND OF THE INVENTION

1. Field of Invention

The invention relates to an automatic transmission, and more particularly to a hydraulic pressure control apparatus for controlling engagement elements accommodated in a planetary gear transmission mechanism of the automatic transmission.

2. Description of Related Art

Hitherto, an automatic transmission incorporates a planetary gear transmission mechanism for realizing a predetermined gear ratio by using selective engagement of friction members constituting a plurality of engagement elements, such as clutches and brakes; and a hydraulic pressure control apparatus for controlling a hydraulic pressure servo for engaging/releasing the frictional members of each engagement element of the transmission mechanism. The conventional circuit structure of the foregoing hydraulic-pressure control apparatus having a relatively small number of gear ratios is such that shift valves which are switched among the gear ratios are provided to correspond to the number of the gear ratios. Moreover, hydraulic pressure sequentially passes through the shift valves so as to be applied to a predetermined hydraulic pressure servo.

To meet requirements including a requirement for reducing fuel consumption, the number of the gear ratios of the automatic transmission has been increased. As a technique for increasing the number of gear ratios by combining a plurality of planetary gears, a technique has been disclosed in Japanese Patent Laid-Open No. 4-219553. The technique is to use a gear train constituted by combining a planetary gear for inputting reduced speed with a Ravigneaux-type planetary gear set. Thus, a small number of transmission elements and of engagement elements are able to realize six speeds in the forward direction and one speed in the reverse direction.

When the planetary gear transmission mechanism having the multiple gear ratios is controlled by a conventional circuit structure having shift valves, the number of valves undesirably increases. Thus, the cost is enlarged excessively. Moreover, the circuit structure becomes furthermore complicated, causing the size of the hydraulic-pressure control apparatus to be undesirably enlarged. Usually, the hydraulic-pressure control apparatus has a structure formed into a valve body which totally incorporates each of valves. The valve body is disposed in the side portion of the transmission mechanism. Therefore, when the size of the valve body is enlarged, the size of the transmission is correspondingly enlarged. As a result, easy mounting on the automatic transmission is inhibited. Therefore, simplification of the circuit structure free of shift valves is required.

The disclosed technique is such that a one-way clutch which is capable of mechanically shifting torque when the engagement element has been released is provided for only the first speed to realize a compact transmission. As a result, gear shift to the second or higher speed is realized by changing clutching of the friction engagement element by using control of the hydraulic pressure. The control of clutching must be performed with a satisfactory response of the hydraulic pressure servo such that either of the frictional engagement elements is engaged while the other frictional engagement element is released. To simplify the circuit structure and improve the controllability of each engagement element, it might be considered feasible to structure the hydraulic pressure circuit for controlling each engagement element. That is, a special control valve (a linear solenoid and a duty solenoid) is provided for each engagement element so as to be independently controlled.

Thus, shift of the gear to each gear ratio can be performed such that the frictional engagement element to be engaged and the frictional engagement element to be released can directly be controlled. Because each of the special control valves is provided, jump of shift is permitted. If breakdown of the solenoid of the control valve for controlling each engagement element occurs or a mistake of a signal is made, so-called interlocking occurs. That is, two or more frictional engagement elements, the engagement of which must be prevented, are engaged in a predetermined gear ratio. As a result, the durability of each frictional engagement element deteriorates.

SUMMARY OF THE INVENTION

Accordingly, an object of the invention is to provide a hydraulic pressure control apparatus for an automatic transmission which is capable of overcoming the foregoing problems and which has a circuit structure permitting a jump of the gear ratio and enablement to prevent the occurrence of interlocking of the transmission mechanism.

To achieve the foregoing object, according to the invention, there is provided a hydraulic pressure control apparatus for an automatic transmission including a planetary gear transmission mechanism incorporating at least five engagement elements to selectively be engaged to realize a predetermined gear ratio; and a hydraulic-pressure control apparatus for controlling the engagement elements of the transmission mechanism so that when a first engagement element C-1 and a fourth engagement element B-3 are engaged, a first speed is realized; when the first engagement element C-1 and a fifth engagement element B-1 are engaged, a second speed is realized; when the first engagement element C-1 and a third engagement element C-3 are engaged, a third speed is realized; when the first engagement element C-1 and a second engagement element C-2 are engaged, a fourth speed is realized; when the second engagement element C-2 and the third engagement element C-3 are engaged, a fifth speed is realized; and when the second engagement element C-2 and the fifth engagement element B-1 are engaged, a sixth speed is realized, wherein the hydraulic-pressure control apparatus is provided with cutoff valves 75, 76, 77, 78 for inhibiting combinations with which interlocking of the transmission mechanism occurs due to engagement of two or more engagement elements of the five engagement elements when each of the forward gear ratios including the first speed to the sixth speed has been realized.

Specifically, it is effective that the planetary gear transmission mechanism incorporates a planetary gear for inputting reduced speed and a planetary gear set for inputting reduced revolutions from the planetary gear for inputting the reduced speed, the first engagement element C-1 is a first clutch for inputting the reduced revolutions to a first transmission element S3, the second engagement element C-2 is a second clutch for inputting revolutions input from an engine to a second transmission element C2, C3, the third engagement element C-3 is a third clutch for inputting reduced revolutions to a third transmission element S2 of the planetary gear, the fourth engagement element B-3 is a first brake for fixing the second transmission element C2, C3 of the planetary gear, and the fifth engagement element B-1 is a second brake for fixing the third transmission element S2 of the planetary gear.

It is effective that the combinations with which interlocking of the transmission mechanism occurs when the forward gear ratio has been realized and which are inhibited incorporate a first pattern having combinations of two engagements and a second pattern having combinations of three engagements, the first pattern at least incorporates four combinations of engagements between the second engagement element C-2 and the fourth engagement element B-3, between the third engagement element C-3 and the fifth engagement element B-1, between the third engagement element C-3 and the fourth engagement element B-3 and between the fourth engagement element B-3 and the fifth engagement element B-1, the second pattern incorporates two combinations of engagements among the first engagement element C-1, the second engagement element C-2 and the third engagement element C-3 and among the first engagement element C-1, the second engagement element C-2 and the fifth engagement element B-1, and the valve inhibits the above-identified six combinations.

It is effective that each of the engagement elements is provided with pressure regulating means for regulating the hydraulic pressure supplied from a hydraulic pressure source, supply/discharge of the hydraulic pressure regulated by the pressure regulating means causes engagement/release to be performed, and the valve is operated due to supply of hydraulic pressure to a predetermined engagement element.

It is effective that the third engagement element C-3 and the fourth engagement element B-3 to be engaged when the forward gear ratio has been realized are engaged so that a reverse gear ratio is realized, the combination which is inhibited when the forward gear ratio has been realized incorporates a combination of the third engagement element C-3 and the fourth engagement element B-3, and means is provided which supplies hydraulic pressure to the fourth engagement element B-3 when the reverse gear ratio has been realized.

It is effective that a first passage through which the hydraulic pressure is, through the valve 78, supplied to the fourth engagement element B-3 to be engaged when the forward gear ratio has been realized or when the reverse gear ratio has been realized and a second passage through which the hydraulic pressure is supplied without passage through the valve are provided, and the means for supplying the hydraulic pressure is the second passage.

It is effective that communication of the first passage and that of the second passage with the fourth engagement element B-3 are permitted through a switching valve, and the switch is disposed between the valve and the fourth engagement element B-3.

It is effective that the switching valve can be operated by a solenoid valve SL1 so that selective communication between the first passage or the second passage with the fourth engagement element B-3 is permitted.

It is effective that the switching valve can be operated with the hydraulic pressure which acts when the reverse gear ratio has been realized so that when the hydraulic pressure is applied, the first passage and the fourth engagement element B-3 are disconnected from one another and the second passage and the fourth engagement element B-3 are in communication with each other.

It is effective that the switching valve is a check valve, and communication of the check valve with the fourth engagement element B-3 is permitted due to the hydraulic pressure supplied through the first passage or the second passage.

It is effective that the cutoff valve is disposed between the hydraulic pressure source and the fourth engagement element B-3 to be engaged when the reverse gear ratio has been realized to cancel the communication between the hydraulic pressure source and the fourth engagement element B-3 when interlocking of the transmission mechanism has occurred, the means for supplying the hydraulic pressure is the cutoff valve, and the cutoff valve is brought to a position to permit communication between the hydraulic pressure source and the fourth engagement element B-3 due to applied hydraulic pressure which acts when the reverse gear ratio has been realized.

It is effective that the cutoff valve is structured such that the hydraulic pressure to be applied to the third engagement element C-3 is applied to the cutoff valve from at least one direction and spring force is exerted on the cutoff valve from another direction, and the cutoff valve is operated when the hydraulic pressure to be applied to the third engagement element C-3 is raised to a level higher than the spring force.

It is effective that the communication is inhibited when the forward gear ratio that has been realized incorporates a first pattern having combinations of two engagement elements and a second pattern having combinations of three engagement elements, and the cutoff valve incorporates first-pattern inhibiting (cutoff) valves 78, 77 for inhibiting the first pattern and second-pattern inhibiting (cutoff) valves 75, 76 for inhibiting the second pattern.

It is effective that the first pattern at least incorporates four combinations of engagements between the second engagement element C-2 and the fourth engagement element B-3, between the third engagement element C-3 and the fifth engagement element B-1, between the third engagement element C-3 and the fourth engagement element B-3 and between the fourth engagement element B-3 and the fifth engagement element B-1, and the first-pattern inhibiting valve incorporates a first valve 78 structured such that the hydraulic pressure is applied to at least the second engagement element C-2, the third engagement element C-3 and the fifth engagement element B-1 and the fourth engagement element B-3 is drained.

It is effective that the second pattern incorporates two combinations of engagements among the first engagement element C-1, the second engagement element C-2 and the third engagement element C-3 and among the first engagement element C-1, the second engagement element C-2 and the fifth engagement element B-1, the second-pattern inhibiting valve incorporates a second valve 75A structured such that the hydraulic pressure is applied to at least the first engagement element C-1, or the second engagement element C-2, the third engagement element C-3 and the fifth engagement element B-1 and the first engagement element C-1 or the second engagement element C-2 is drained.

It is effective that the second valve incorporates a common pressure-receiving portion to which the hydraulic pressure to be applied to the third engagement element C-3 and the fifth engagement element B-1 is applied, and a third valve 76' is provided for selectively applying, to the common pressure-receiving portion, the hydraulic pressure to be applied to the third engagement element C-3 and the fifth engagement element B-1.

It is effective that the second pattern incorporates two combinations of engagements among the first engagement element C-1, the second engagement element C-2 and the third engagement element C-3 and among the first engagement element C-1, the second engagement element C-2 and the fifth engagement element B-1, and the second-pattern inhibiting valve incorporates a fourth valve 75 and a fifth valve 76 corresponding to the combinations.

It is effective that the cutoff valves 75, 76 are valves which use the hydraulic pressure to be applied to any of the engagement elements C-2, C-3; C-2, B-1 to drain the hydraulic pressure to be applied to the other engagement element C-1, the valve is structured such that the hydraulic pressure is applied to the other engagement element C-1 from one direction together with the hydraulic pressure to be applied to the engagement elements C-2, C-3; C-2, B-1 and to be operated when the hydraulic pressure to be applied to the other engagement element has been applied together with the hydraulic pressure to the engagement elements C-2, C-3; C-2, B-1.

It is effective that the cutoff valves 77, 78 are valves which use the hydraulic pressure to be applied to the engagement elements C-3, B-1; C-2, C-3 to drain the hydraulic pressure to be applied to the other engagement elements B-1, B-3, and the valve is structured such that only the hydraulic pressure to be applied to the engagement elements C-3, B-1; C-2, C-3 from one direction and to be operated when the hydraulic pressure has been applied to the engagement elements C-3, B-1; C-2, C-3.

It is effective that a hydraulic pressure servo for operating each of the engagement elements C-1 through C-3, B-1, B-3 incorporates a cylinder, a piston hermetically accommodated in the cylinder and a return spring disposed opposite to the operation of the piston, the hydraulic pressure level corresponding to the load of the return spring is made to be the same among the engagement elements, and the cutoff valve is operated when the hydraulic pressure applied to at least one engagement element is raised to a level not lower than the hydraulic pressure corresponding to the load of the return spring.

It is effective that the cutoff valve is structured such that the spring force is exerted on the cutoff valve from at least the other direction and also structured such that balance is kept with the applied hydraulic pressure which is applied to the engagement element from at least one direction, and the spring force is a load corresponding to the hydraulic pressure of the return spring of the engagement element.

It is effective that the cutoff valves 75, 76 are applied with the spring force and a line pressure from the other direction, and the valve is shifted to a position at which the hydraulic pressure to be applied to the other engagement element is drained when either of the engagement elements is in an engaged state and the hydraulic pressure to be applied to the other engagement element is raised to a level not lower than the spring force.

It is effective that the valve 75' is applied with only the line pressure from the other direction. It is effective that the cutoff valves 77, 78 are applied with only the spring force from the other direction.

It is effective that the fifth engagement element B-1 is provided for an engine brake, a sixth engagement element B-2 is disposed in parallel with the fifth engagement element B-1 and in series with a one-way clutch F-1, and the first pattern further incorporates a combination of the fourth engagement element B-3 and the sixth engagement element B-2.

It is effective that the first valve is a valve structured such that the hydraulic pressure to be applied to the sixth engagement element B-2 is applied to the first valve together with the hydraulic pressure to be applied to the second engagement element C-2, the third engagement element C-3 and the fifth engagement element B-1 and to use the hydraulic pressure to be applied to at least one engagement element to drain the first brake, and the sixth engagement element B-2 is always maintained at a state of engagement in the second speed through the sixth speed.

It is effective that pressure regulating means for regulating the hydraulic pressure applied from the hydraulic pressure source is also provided, the hydraulic pressure applied from the pressure regulating means is applied to a hydraulic pressure servo which operates each engagement element, and the valve is disposed between the hydraulic pressure source and the pressure regulating means.

It is effective that the valves 75, 76 are structured such that the hydraulic pressure between the valve and the pressure regulating means is applied to the valve from one direction and as well as structured such that the hydraulic pressure is applied when the valve is at a first position and the hydraulic pressure is drained when the valve is at a second position.

It is effective that the valve is applied with the hydraulic pressure from the hydraulic pressure source from another direction when the valve is at the second position.

The structure of the first aspect of the invention has the valve for preventing interlocking. Therefore, interlocking of two or more engagement elements, the engagement of which must be prevented, when the forward gear ratio has been realized can be prevented. As a result, deterioration in the durability of each engagement element can be prevented.

The structure of the second aspect of the invention has the valve for preventing the combinations which cause interlocking to occur provided for the structure which realizes six speeds in the forward direction by using the combination of passages for inputting the reduced speed and the planetary gear set. Therefore, deterioration in the durability of the frictional engagement element can be prevented.

The structure of the third aspect of the invention is arranged to selectively engage the five engagement elements to each other to realize the six speeds in the forward direction and is formed such that the foregoing six combinations are inhibited to reliably prevent interlocking. As a result, deterioration in the durability of the frictional engagement elements can be prevented.

The structure of the fourth aspect of the invention is provided with the pressure regulating means corresponding to each engagement element to enable a jump in the gear ratio to be performed. Because the valve is operated with the hydraulic pressure applied to a predetermined engagement element, the need to provide a solenoid for controlling the valve can be eliminated. Thus, a compact structure can be realized.

The structure of the fifth aspect of the invention is such that the means for applying the hydraulic pressure to the engagement element when the reverse gear ratio has been realized to achieve both the prevention of interlocking when the forward gear ratio has been realized and the achievement of the reverse gear ratio when reverse movement is performed if the combination causing interlocking when the forward gear ratio has been realized is the combination for realizing the reverse gear ratio.

The structure of the sixth aspect of the invention is such that the hydraulic pressure is applied to each engagement element through the second passage when the reverse gear ratio has been realized so that the reverse gear ratio is reliably set.

The structure of the seventh aspect of the invention enables hydraulic pressure to be applied to the switching valve through the second passage if no hydraulic pressure is applied to the switching valve from the valve owing to the operation of the valve when the reverse gear ratio has been realized. Therefore, the reverse gear ratio can reliably be realized.

The structure of the eighth aspect of the invention has the solenoid which is capable of selectively interrupting the supply of hydraulic pressure to the engagement element when the forward gear ratio has been realized. As a result, common use of the solenoid is permitted.

The structure of the ninth aspect of the invention enables a solenoid to be omitted. Thus, a compact structure can be realized.

The structure of the tenth aspect of the invention enables a switching valve to be omitted. Thus, a compact structure can be realized.

The structure of the eleventh aspect of the invention is such that the valve is disposed at a position at which the hydraulic pressure source and the engagement element are communicated with each other when the reverse gear ratio has been realized. Therefore, the reverse gear ratio can be reliably realized.

The structure of the twelfth aspect of the invention is such that the force realized by the pressure supplied to the third engagement element C-3 and the spring force are brought into balance. When balance is kept with the line pressure, locking of the valve with the line pressure, which is the hydraulic pressure to be used when reverse movement is performed and which is applied from the other direction, requires an individual pressure receiving surface larger than the pressure receiving surface to which the line pressure is applied. Therefore, the manufacturing cost of the valve spool is increased. On the other hand, the foregoing structure is able to eliminate the need for individually manufacturing the valve spool for applying the line pressure which is the hydraulic pressure for use when the reverse movement is performed. Therefore, the manufacturing cost can be reduced.

The structure of the thirteenth aspect of the invention is such that the valve is independently provided for each of the first pattern and the second pattern. Therefore, a more compact structure can be realized without complicating the hydraulic pressure circuit.

The structure of the fourteenth aspect of the invention is such that the first brake is drained. Therefore, only one valve is able to correspond to the three combinations.

Therefore, a compact structure is realized.

The structure of the fifteenth aspect of the invention is such that the first clutch or the second clutch is drained. Thus, only one valve is able to correspond to the two combinations. Therefore, a compact structure is realized.

The structure of the sixteenth aspect of the invention is such that the pressure receiving portions of the valve are formed into a common structure. Thus, the cost of the machining facilities for realizing accuracy of the coaxiality of the valve spool required when one valve corresponds to the two combinations is reduced.

The structure of the seventeenth aspect of the invention is such that an independent valve is provided for each combination. Therefore, the cost of the machining facilities for realizing accuracy of the coaxiality of the valve spool is reduced.

The structure of the eighteenth aspect of the invention is such that the operation of the valve is started only when breakdown of the control valve for controlling either of the engagement elements occurs and, therefore, a supplying state has been realized. Therefore, any unnecessary operation in a normal state can be prevented.

The structure of the nineteenth aspect of the invention is able to eliminate the need for applying the hydraulic pressure to the other engagement element from one direction. Therefore, the manufacturing cost of the valve spool is reduced.

The structure of the twentieth aspect of the invention is such that the hydraulic pressure levels corresponding to the load of the return spring are made to be the same among the plurality of engagement elements. Therefore, a malfunction of the valve can be reliably prevented.

The structure of the twenty-first aspect of the invention enables the valve to be operated with the hydraulic pressure before the engagement element starts transmission of the torque, that is, the hydraulic pressure of the return spring. Therefore, tie-up occurring when interlocking has occurred can be prevented.

The structure of the twenty-second aspect of the invention has the structure that the hydraulic pressure to be applied to the other engagement element is balanced by the spring force as compared with the structure that the hydraulic pressures of at least two engagement elements and the line pressure must be balanced to switch the valves and, therefore, the design becomes too complicated. Therefore, the line pressure is simply required to be balanced with the hydraulic pressure of one engagement element. As a result, the design can be considerably facilitated.

The structure of the twenty-third aspect of the invention does not require any spring and the like. Thus, the number of the elements is reduced.

The structure of the twenty-fourth aspect of the invention is able to eliminate the need for considering the pressure receiving area of the valve spool when balance is kept by using the line pressure because the balance is kept by only the spring. Therefore, the design can be facilitated and a circuit for applying the line pressure is not required. Thus, a compact structure is realized.

The structure of the twenty-fifth aspect of the invention is such that a valve is independently provided for each of the first and second patterns. Therefore, any special circuit is not required and, thus, satisfactory controllability can be realized.

The structure of the twenty-sixth aspect of the invention is such that the second brake which does not concern the torque transmission is always engaged. Therefore, the first valve can be operated to drain the servo pressure of the first brake. As a result, non-operation of the valve owing to no action on the valve in spite of the engaged state of the engagement elements except for the second brake can be prevented.

The structure of the twenty-seventh aspect of the invention is such that the regulated hydraulic pressure is directly applied to the engagement element. In a case where the valve is disposed between the pressure regulating means and the engagement element, the response deteriorates when the engagement element is engaged because the valve disposed in the passage for applying the regulated hydraulic pressure to the engagement element is made to be a resistance when the regulated hydraulic pressure passes through the valve. As a result, the response can be improved.

The structure of the twenty-eighth aspect of the invention is such that when the valve is operated and the second position is realized, the hydraulic pressure applied to correspond to the hydraulic pressure which is applied to the engagement element is drained. Therefore, when a switch to the second position has been performed, undesirable shift to the first position can be prevented.

The structure of the twenty-ninth aspect of the invention is such that the hydraulic pressure is applied to the valve in the same direction as the direction in which the hydraulic pressure is applied to the engagement element. Therefore, an undesirable switch can be reliably prevented.

BRIEF DESCRIPTION OF THE DRAWINGS

FIG. 2 is an operation table of the gear train;

FIG. 4 is a table showing combinations of engagement of two engagement elements in the gear train;

FIG. 5 is a table showing combinations of three engagement elements in the gear train;

FIG. 6 is a table showing combinations of engagement of two elements of the gear train which must be inhibited;

FIG. 7 is a table showing combinations of engagement of three elements of the gear train which must be inhibited;

FIG. 12 is a table showing the operation of the solenoid of the hydraulic-pressure control apparatus;

FIG. 13 is a table showing the operation of each fail-safe valve of the hydraulic-pressure control apparatus;

FIG. 20. is a table showing the operation of each fail-safe valve according to a second embodiment of the invention;

FIG. 21 is a developed schematic diagram showing a gear train of an automatic transmission according to a third embodiment of the invention;

FIG. 22 is a table showing the operation of the gear train of the third embodiment;

FIG. 23 is a table showing combinations of two engagement elements in the gear train of the third embodiment;

FIG. 24 is a table showing combination of three engagement elements in the gear train of the third embodiment;

FIG. 25 is a table showing combinations of two engagement elements in the gear train of the third embodiment which must be inhibited; and FIG. 26 is a table showing combinations of three engagement elements in the gear train of the third embodiment which must be inhibited.

DETAILED DESCRIPTION OF PREFERRED EMBODIMENTS

Figure 1:
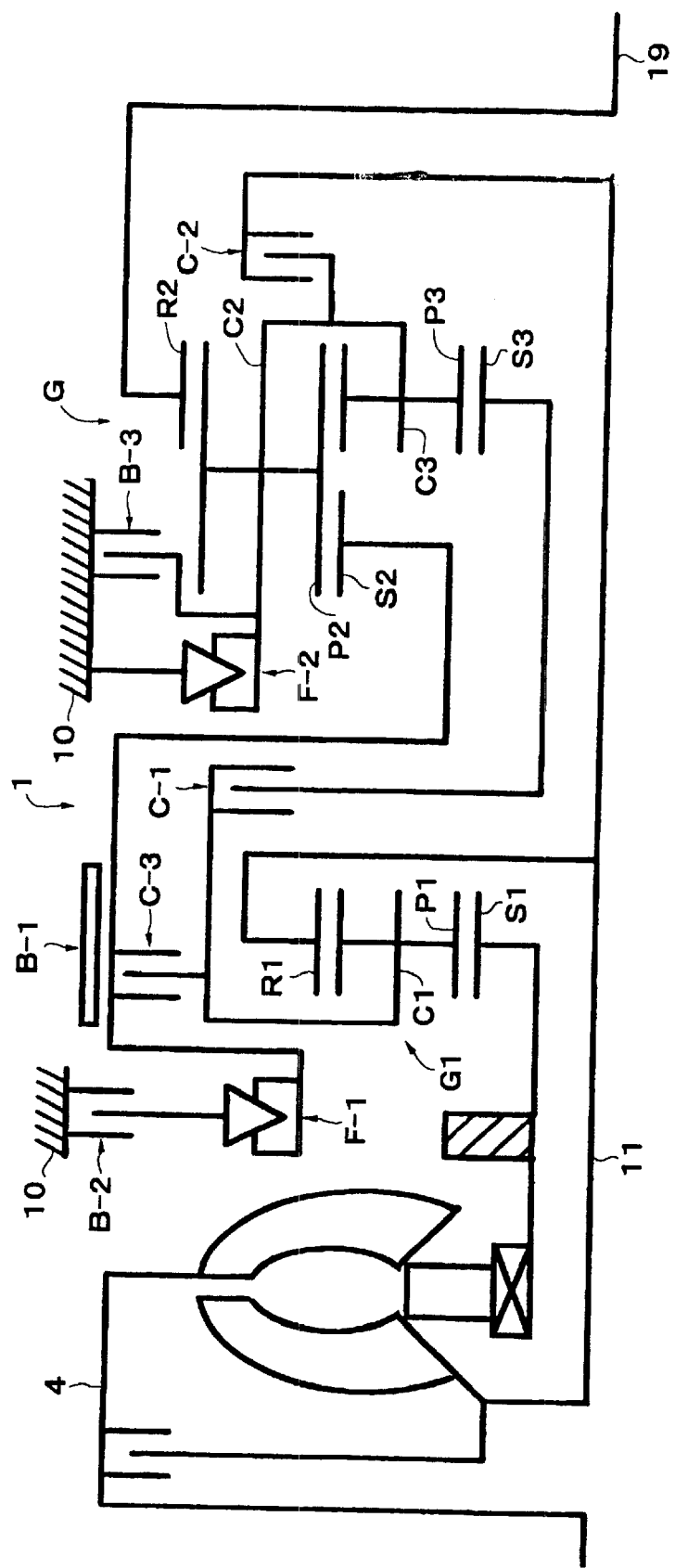
FIG. 1 is a developed schematic diagram showing a gear train of an automatic transmission according to a first embodiment of the invention.

A first embodiment will now be described in which the present invention is applied to an automatic transmission having six forward speeds and one reverse speed. As shown in FIG. 1, the automatic transmission has a structure of a vertical transmission for a front-engine and rear drive (FR) vehicle incorporating a torque converter 4 having a lockup clutch and a planetary gear transmission mechanism 1 which are disposed on one axis.

The planetary gear transmission mechanism 1 of the automatic transmission incorporates a Ravigneaux-type planetary gear set G and a reduced-speed inputting planetary gear (hereinafter called a "speed-reducing planetary gear") G1 for inputting reduced revolutions to the planetary gear set G. The planetary gear set G incorporates four transmission elements consisting of a front sun gear S2 having a large diameter, a rear sun gear S3 having a small diameter, a carrier C2 (C3) for supporting a long pinion P2 and a short pinion P3 which are engaged to each other such that the long pinion P2 engages to the front sun gear S2 and the short pinion P3 engages to the rear sun gear S3, and a ring gear R2 (R3) which engages the long pinion P2. The speed-reducing planetary gear G1 is a simple planetary gear composed of three elements, a sun gear S1, a carrier C1 which supports a pinion P1 engaged to the sun gear S1, and a ring gear R1 engaged to the pinion P1.

Each transmission element of the planetary gear set G is such that the rear sun gear S3, which is a first transmission element, is connected to the carrier C1 of the speed-reducing planetary gear G1 by a clutch (C-1) (hereinafter abbreviated as a "C1 clutch") serving as a first engagement element C-1 and having a multiple-disc structure. Also the front sun gear S2 serving as a third transmission element is connected to the carrier C1 of the speed-reducing planetary gear G1 by a clutch (C-3) (hereinafter abbreviated as a "C3 clutch") serving as a third engagement element C-3 and having a multiple-disc structure and engagable to a case 10 by a brake (B-1)(hereinafter abbreviated as a "B-1") serving as a fifth engagement element B-1 and having a band drum structure. Moreover, the carrier C2 (C3) serving as a second transmission element is connected to an input shaft 11 by a clutch (C-2) (hereinafter abbreviated as a "C2 clutch") serving as a second engagement element C-2 and having a multiple-disc structure and engagable to the case 10 by a brake (B-3) (hereinafter called a "B3 brake") serving as a fourth engagement element B-3 and having a multiple-disc structure. The ring gear R2 (R3) is, as an output member, connected to an output shaft 19. In parallel with the B1 brake, are a one-way clutch (F-1) and a brake (B-2) (hereinafter abbreviated as a "B2 brake") that makes one-way engagement of the one-way clutch (F-1) serving as the sixth engagement element effective. In parallel with the B3 brake is a one-way clutch (F-2).

The speed-reducing planetary gear G1 is structured such that its sun gear S1 is secured to the transmission case 10, the ring gear R1 is connected to the input shaft 11, the carrier C1 is, through the C1 clutch, connected to the rear sun gear S3 of the planetary gear set G, and connected to the front sun gear S2 of the planetary gear set G through the C3 clutch so as to be disposed in the front portion of the planetary gear set G.

Figure 3:
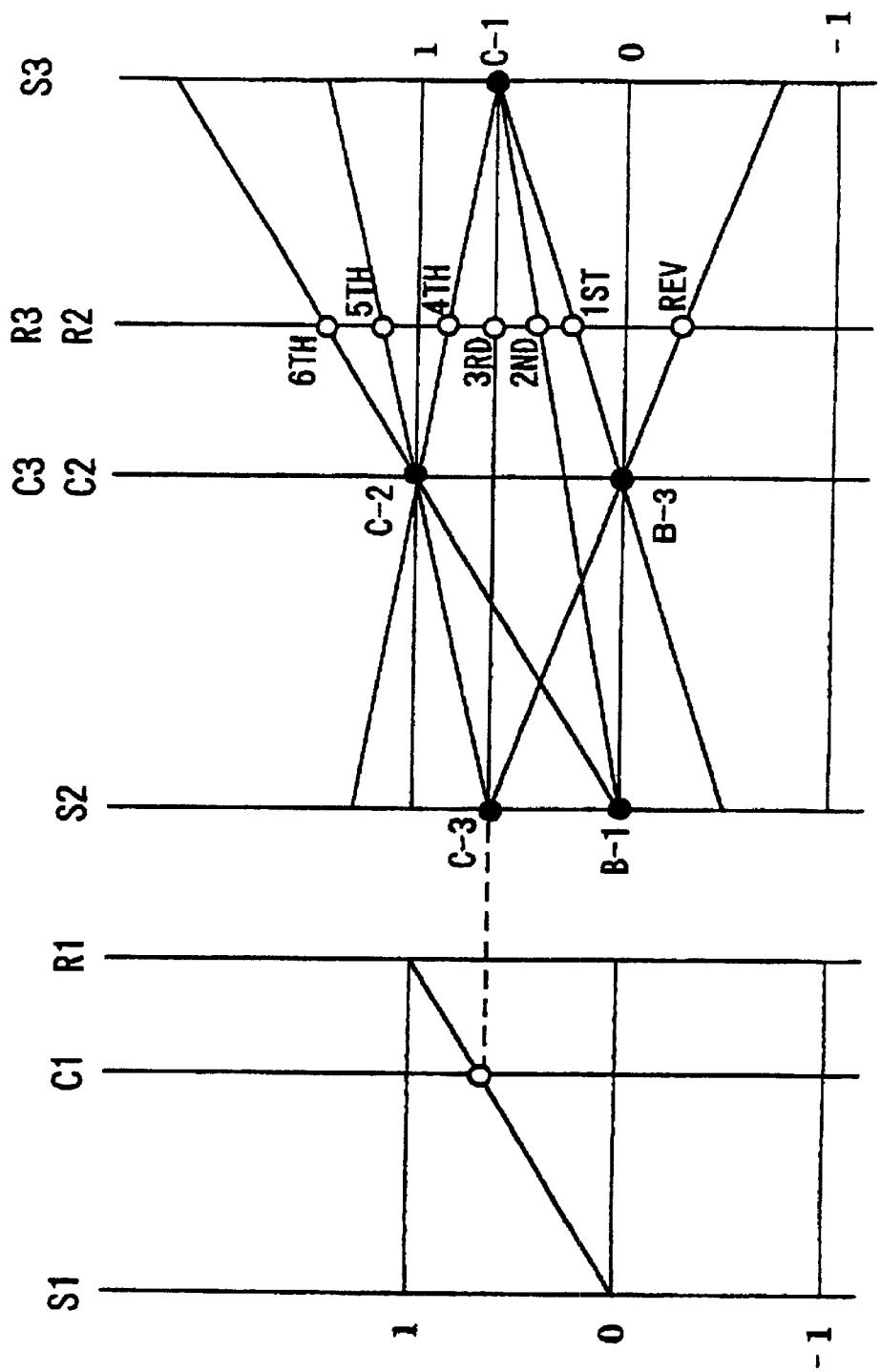
FIG. 3 is a speed table of the gear train.

The automatic transmission having the above-mentioned structure is controlled by an electronic control unit (not shown) and a hydraulic pressure control unit to be described later. Thus, a transmission operation is performed in accordance with a load of the vehicle and the car speed to satisfy a gear ratio range corresponding to the range selected by a driver. FIG. 2 shows tabulated gear ratios realized by engagement and release (symbol ● indicates the engagement, ○ indicates engagement without transmission of torque, and no symbol indicates the release) of each of the foregoing clutches, brakes or one-way clutches. FIG. 3 is a speed graph showing engagement (indicated with mark ●) of each engagement element and the resulting speed of revolution (indicated with mark ○) of each transmission element such that the axis of the ordinate stands for each transmission element with the lateral intervals corresponding to the gear ratio of each transmission element. Moreover, the axis of the abscissa stands for the speed ratio of the revolution of each transmission element.

As can be understood from the engagement table (FIG. 2) and the speed diagram (FIG. 3), the first speed (1ST) in the drive range of the gear train is realized by the engagement of the C1 clutch and the engagement of the one-way clutch (F-2) corresponding to the engagement of the B3 brake. The reason why the one-way clutch (F-2) is employed as a substitute for the B3 brake lies in that the release caused from engagement of another engagement element when an up-shift is performed is attempted to be performed by using inversion of the torque of the reaction with no control. In the foregoing case, the revolutions transmitted from the input shaft 11 and reduced by the speed-reducing planetary gear G1 are input to the rear sun gear S3 of the planetary gear set G through the C1 clutch. Then, the reaction of the revolutions is, through the engagement of the one-way clutch (F-2), exerted on the carrier C2 supported by the case 10. Thus, reduced revolutions (refer to 1ST shown in FIG. 3) at the highest reduction ratio of the ring gear R2 are output to the output shaft 19.

On the other hand, when coasting at the first speed (shown as "E/G brake" in FIG. 2) is performed, the B3 brake is engaged as a substitute for the one-way clutch (F-2) which is switched to an idle state owing to the inversion of the torque of the reaction so that the first speed (1ST) is realized. In the foregoing case, the input supplied from the output shaft 19 to the ring gear R2 of the planetary gear set G is output to the rear sun gear S3 such that its reaction is exerted on the carrier C2 which is engaged due to the engagement of the B3 brake. The torque is accelerated by the speed-reducing planetary gear G1 through the C1 clutch so as to be transmitted to the input shaft 11. Then, the torque is allowed to pass through the torque converter 4 so as to be input to the engine. The pumping operation of the engine produces a braking effect.

Then, the second speed (2ND) is realized due to the engagement between the C1 clutch, the B2 brake and the one-way clutch (F-1) (the reason why the engagement between the one-way clutch (F-1) and the B2 brake is used as a substitute for the B1 brake which must be engaged basically lies in that the control of the release required when clutching of another engagement element for up-shift or down-shift is intended to be eliminated). In the foregoing case, revolutions transmitted from the input shaft 11, and reduced through the speed-reducing planetary gear G1, are input to the rear sun gear S3 through the C1 clutch. The reduced revolutions are output to the output shaft 19 such that the reaction is exerted on the front sun gear S2 engaged to the one-way clutch (F-1) held in a locked state due to the engagement of the B2 brake. The reduction ratio is lower than that at the first speed (1ST) at this time, as shown in FIG. 3.

When coasting at the second speed, the technique is transmitted in an inverted route similarly to the case of the first speed (1ST). The reaction is exerted on the front sun gear S2 engaged due to the engagement of the B1 brake used as a substitute for the one-way clutch (F-1) which is brought to the idle state when the direction of the torque which is exerted on the one-way clutch (F-1) is reversed. Thus, a braking effect is produced owing to the pumping action of the engine for braking the torque transmitted to the input shaft 11. The B2 brake which has made effective the engagement of the one-way clutch (F-1) in a drive range is no longer correlated with the transmission of the torque. Therefore, the engagement of the B2 brake at gear speeds higher than the third speed, which the engagement of the B2 brake does not effect, is maintained engaged to simplify transmission control.

The third speed (3RD) is realized by the simultaneous engagement of the C1 clutch and the C3 clutch. In the foregoing case, the revolutions transmitted from the input shaft 11 and reduced by the speed-reducing planetary gear G1 are simultaneously input to the front sun gear S2 and the rear sun gear S3 thorough the C1 clutch and the C3 clutch. Thus, the planetary gear set G is brought to a state of the direct connection. Therefore, the revolutions of the ring gear R2 which are the same as the revolutions input to the two sun gears S2, S3 are reduced from the revolutions of the input shaft 11 in an amount corresponding to the reduction caused by the speed-reducing planetary gear G1 so as to be transmitted to the output shaft 19.

The fourth speed (4TH) is realized by the simultaneous engagement of the C1 clutch and the C2 clutch. In the foregoing case, the revolutions transmitted from the input shaft 11 and reduced by the speed-reducing planetary gear G1 are input to the rear sun gear S3 through the C1 clutch. On the other hand, non-reduced revolutions transmitted from the input shaft 11 and input through the C2 clutch are input to the carrier C3. Intermediate revolutions between the two input revolutions, which are slightly reduced as compared with the revolutions of the input shaft 11 are output to the output shaft 19 as revolutions which have been slightly reduced.

The fifth speed (5TH) is realized by the simultaneous engagement of the C2 clutch and the C3 clutch. In the foregoing case, the revolutions transmitted from the input shaft 11 and reduced by the speed-reducing planetary gear G1 are input to the front sun gear S2 through the C3 clutch. On the other hand, non-reduced revolutions transmitted from the input shaft 11 through the C2 clutch are input to the carrier C2. Thus, revolutions of the ring gear R2 slightly accelerated as compared with the revolutions of the input shaft 11 are output to the output shaft 19.

The sixth speed (6TH) is realized by the engagement of the C2 clutch and the B1 brake. In the foregoing case, non-reduced revolutions transmitted from the input shaft 11 through the C2 clutch are input only to the carrier C2. The revolutions of the ring gear R2, the reaction of which is exerted on the front sun gear S2 engagement owing to the engagement of the B1 brake and which has furthermore been accelerated, are output to the output shaft 19.

Reverse (REV) is realized by the engagement of the C3 clutch and the B3 brake. The revolutions transmitted from the input shaft 11 and reduced by the speed-reducing planetary gear G1 are input to the front sun gear S2 through the C3 clutch. The inverse revolutions of the ring gear R2, the reaction of which is exerted on the carrier C2 engaged due to the engagement of the B3 brake, are output to the output shaft 19.

In the case of the foregoing gear train having the six engagement elements, combinations of engagement of the engagement elements are as follows: the combination (called a "first pattern") of a type that two elements are engaged has 15 combinations as shown in FIG. 4. Combination (1) of the 15 combinations corresponds to the engine brake of the first speed (1stEB), (2) corresponds to the second speed (2ND), (3) corresponds to engine brake of the second speed (2ndEB), (4) corresponds to the third speed (3rd), (5) corresponds to the fourth speed (4th), (6) corresponds to the fifth speed (5th), (7) corresponds to the sixth speed (6th), and (12) corresponds to reverse (Rev). Therefore, the combinations (8) to (15) included in the foregoing pattern obstruct the forward gear ratios. Because the combination of the engagement of the B2 brake and that of the other element can be omitted because of the relationship with the operation of the one-way clutch (F-1), the patterns (9), (10), (12), (14) and (15) are obstructive combinations. When the achievement of the foregoing combinations is inhibited, interlocking can be prevented.

The combinations (called a "second pattern") with which three elements are engaged to one another, as shown in FIG. 5, include 20 combinations. The pattern (3) of the foregoing patterns corresponds to the fourth speed (4th), (6) corresponds to the third speed (3rd), (8) corresponds to engine brake of the second speed (2ndEB), (12) corresponds to the fifth speed (5th) and (14) corresponds to the sixth speed (6th). All of the other combinations except for (1) and (2) are included in any one of the foregoing first patterns. Therefore, only (1) and (2) in the second pattern obstruct the forward gear ratios. Inhibiting achievement of the foregoing combinations may prevent interlocking.

Figure 7:
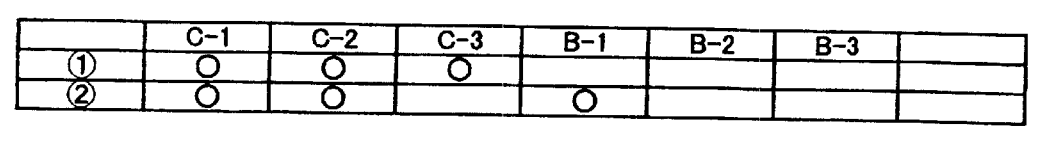

The combinations with which the four or more elements are engaged to one another are omitted from illustration. The foregoing combinations are included in the combination of the two elements or that of the three elements. In summary, the combinations which must be inhibited are (9) and (10), (12), (14) and (15) in the first pattern shown in FIG. 6 and (1) and (2) in the second pattern shown in FIG. 7. Specifically, the five combinations of the engagement between the C2 clutch and the B3 brake, the engagement between the C3 clutch and the B1 brake, the engagement between the C3 clutch and the B3 brake, the engagement between the B3 brake and the B1 brake and the engagement between the B2 brake and the B3 brake; the combination of the engagement such that the C1 clutch, the C2 clutch and the C3 clutch are engaged; and two combinations such that the C1 clutch and the B1 brake, and the C2 clutch and the B1 brake are engaged must be inhibited by valves disposed on the hydraulic pressure circuit by arranging the hydraulic pressure passage.

Figure 8:
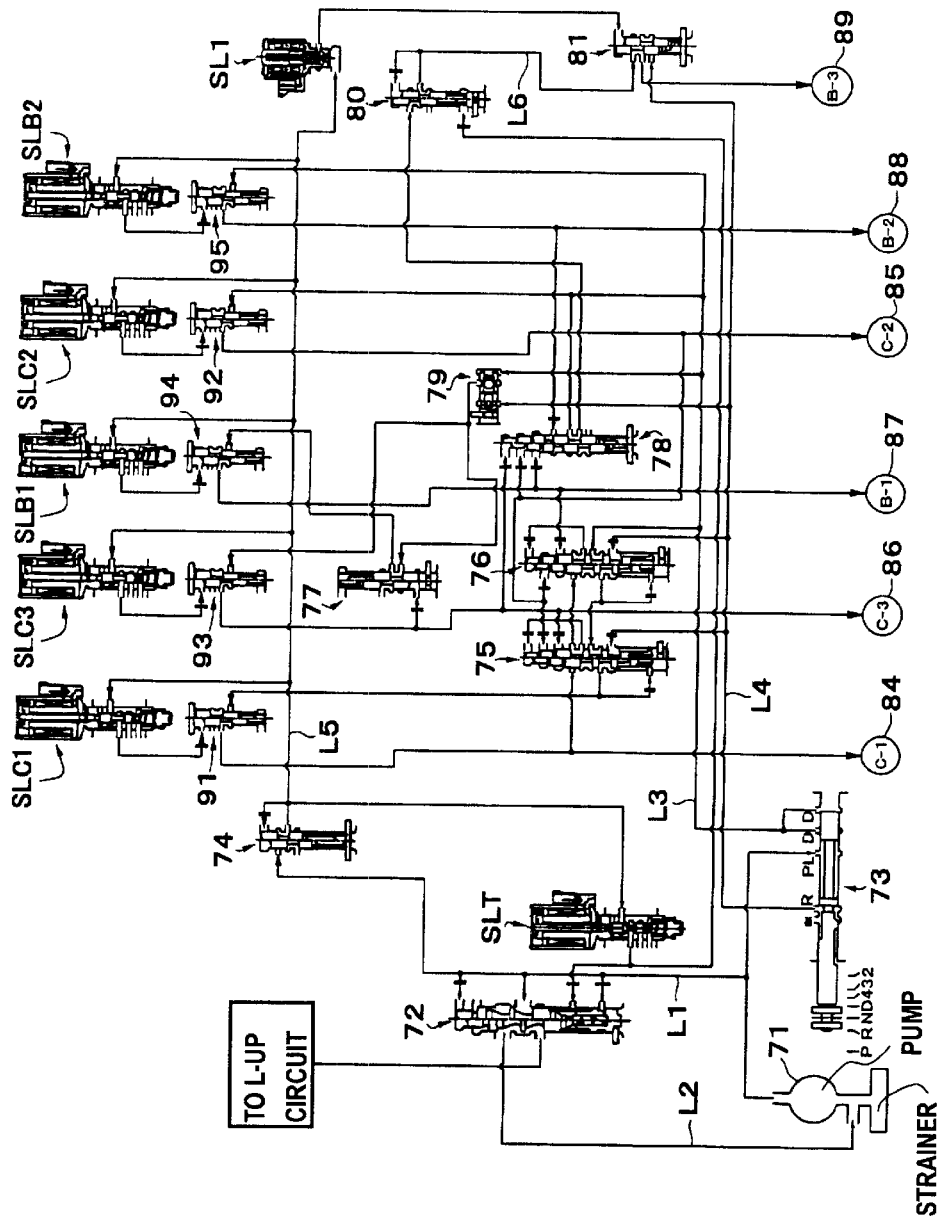
FIG. 8 is an circuit diagram showing a transmission control portion of the hydraulic-pressure control apparatus of the automatic transmission.

A hydraulic pressure control unit adapted to the gear train shown in FIG. 1 and capable of realizing each gear ratio shown in the operation diagram shown in FIG. 2 will now be described. FIG. 8 is an overall circuit structure relating to control of the shift of gears of the hydraulic pressure control unit. The hydraulic pressure circuit constitutes a circuit in which the hydraulic pressure pumped from an oil pump 71 as a hydraulic pressure source so as to be discharged to a line-pressure oil passage L1 is, by a regulator valve 72, regulated while the hydraulic pressure is being arbitrarily discharged to the other oil passages. Thus, an appropriate line pressure corresponding to the drive load of the vehicle is generated. The line pressure is used as a reference pressure for the control such that each valve in the circuit controls the pressure and the direction so as to supply/discharge the hydraulic pressure with respect to the hydraulic pressure servos 84 to 89, which are engagement elements. The circuit is characterized in that a special linear solenoid valve and a control valve serving as pressure regulating means are disposed along the supply route for the hydraulic pressure servo of each of the clutches and brakes.

The primary regulator valve 72 for generating the line pressure as the reference pressure for the circuit is constituted by a pressure regulating valve. The pressure regulating valve incorporates an input port to which direct feedback pressure of the line pressure is applied against the spring force and throttle pressure output from a linear solenoid valve (SLT) is applied as a signal pressure and connected to a line-pressure oil passage L1, an output port communicated with a lockup (L-up) circuit and a spool and a plunger for adjusting the degree of communication with a drain port. When the quantity of discharge from the oil pump 71 and a required line pressure are close to each other, the degree of communication with the drain port is reduced to supply surplus pressure mainly to the lockup circuit and a lubricating oil passage. When the quantity of discharge with respect to the required line pressure is enlarged excessively and, therefore, the applied feedback signal pressure is raised, the degree of communication with the drain port is enlarged to enlarge the quantity of draining to the oil passage L2. Thus, the line pressure is maintained at a predetermined level with which the engagement of the engagement elements is maintained to correspond to the drive load of the vehicle.

The relationship between the valves and oil passage connection will now be described. The manual valve 73 is constituted by a spool valve for switching seven positions including a "P" position for closing the input port connected to the line-pressure oil passage L1, an "R" position for communicating the input port to the R-range output port and draining the other output ports, an "N" position for closing the input port from all of the output ports, "D", "4" and "3" positions for communicating the input port with the D-range output port, draining the R-range output port and closing the second D-range output port and a "2" position for communicating the input port with both of the D-range output port and the second D-range output port and draining the R-range output port. In case of the "D" position, the manual valve 73, through the D-range oil passage L3, supplies the line pressure to the hydraulic pressure servo of each of the B1 brake, the C1 clutch, the C2 clutch, the B2 brake, the B3 brake and the C3 clutch. In case of the "R" position, supply of the hydraulic pressure to the B3-brake hydraulic pressure servo 89 through the R-range oil passage L4 and supply of the hydraulic pressure to a B1 brake hydraulic pressure servo 87 and a C3-clutch hydraulic pressure servo 86 are performed. It is a known fact that the manual valve 73 is switched owing to the operation of the shift lever performed by a driver of the vehicle.

The supply passage for each of the hydraulic pressure servos 84 to 89 of the C1 to C3 clutches and B1 to B3 brakes is basically provided with a pair of pressure regulating means constituted by a control valve and a linear solenoid valve for regulating and releasing corresponding applied pressure. A variety of valves for fail-safe against an error of a signal to the linear solenoid valve and breakdown by maintaining a state of connection of the oil passages are disposed more upstream than the control valve. Specifically, each hydraulic pressure servo, the supply passage of which is selectively the D-range oil passage L3 or the R-range oil passage L4, will now be described.

A C3 control valve 93 which is operated with the signal pressure of the linear solenoid valve (SLC3) is interposed in a supply oil passage for the C3-clutch hydraulic pressure servo 86. A B1 control valve 94 which is operated with the signal pressure of the linear solenoid valve (SLB1) is interposed in a supply oil passage for the B1 brake hydraulic pressure servo 87. As for each hydraulic pressure servo, the supply passage of which is only the D-range oil passage L3, a C1 control valve 91 which is operated with the signal pressure of the linear solenoid valve(SLC1) is interposed in the supply oil passage for the C1-clutch hydraulic pressure servo 84. A C2 control valve 92 which is operated with the signal pressure of the linear solenoid valve (SLC2) is interposed in the supply oil passage for the C2-clutch hydraulic pressure servo 85. A B2 control valve 95 which is operated with the signal pressure of the linear solenoid valve (SLB2) is interposed in the supply oil passage for the B2-brake hydraulic pressure servo 88. Only the supply oil passage for the hydraulic pressure servo 89, the supply passage of which is selectively the R-range oil passage L4 or the D-range oil passage L3, is structured such that the linear solenoid valve (SLT) also regulates the throttle valve which corresponds to the B3 control valve 80.

Figure 9:
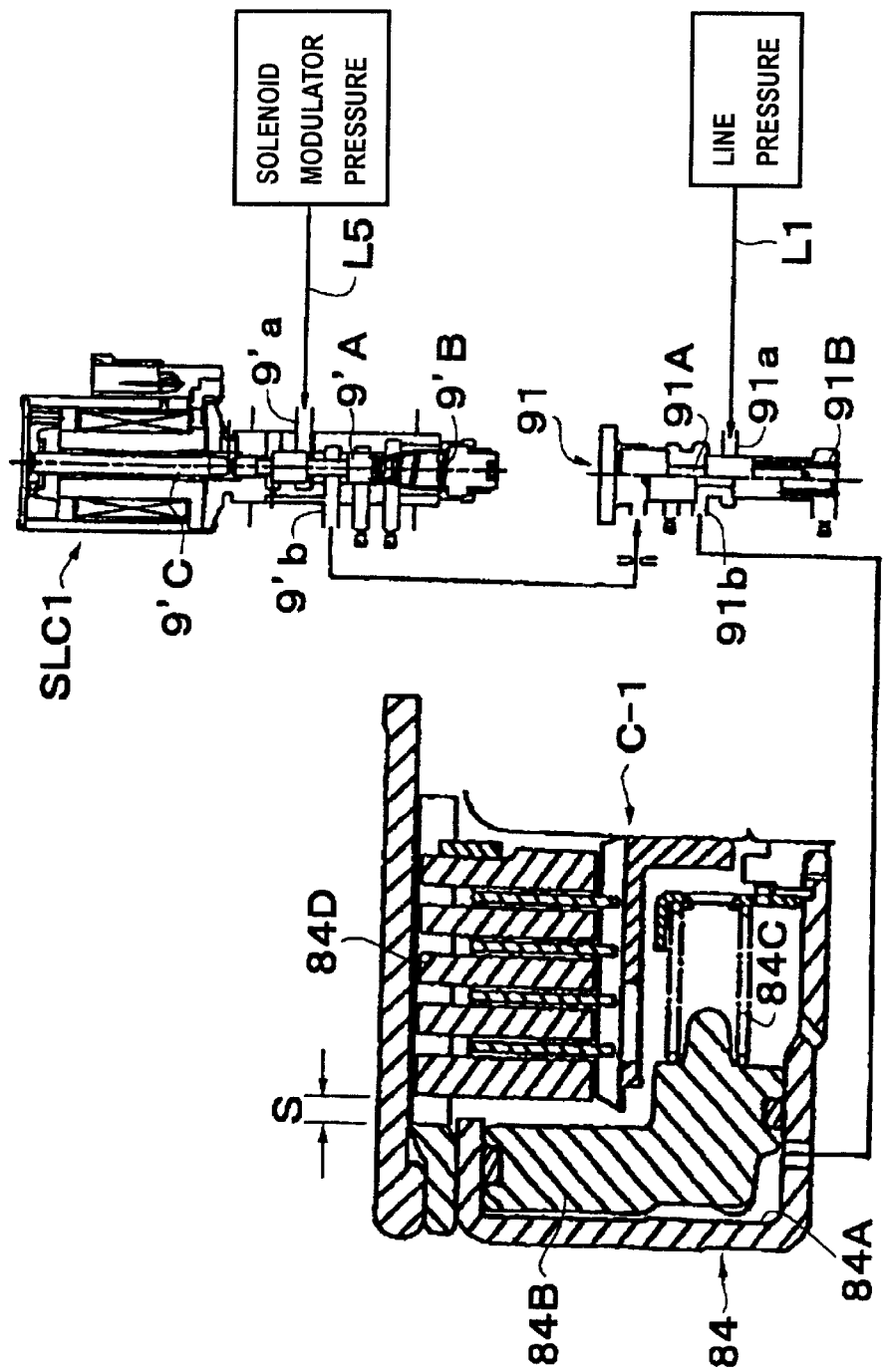
FIG. 9 is a partial circuit diagram showing a hydraulic pressure servo supply passage of the hydraulic-pressure control apparatus.

Each of the clutch valves 91 to 95 has the same structure. As shown in FIG. 9, the supply passage for the C1 clutch, taken as an example, incorporates a control valve 91 which has a spool 91A having lands at two ends thereof; and a spring 91B for exerting spring force on the end of the spool. The control valve 91 uses the balance between the signal pressure (hereinafter called "solenoid pressure") which is applied to another end of the spool 91A from each linear solenoid valve and the spring force to regulate the applied pressure for adjusting the degree of communication between an input port 91a and an output port 91b and drain-connect by communicating the output port 91b and a drain port EX.

Also each of the linear solenoid valves for applying the solenoid pressure to each of the control valves 91 to 95 has the same structure. The supply oil passage for the C1 clutch which is shown as an example in FIG. 9 has a structure that the linear solenoid valve SLC1 incorporates a spool 9'A having a land at each of the two ends thereof, a spring 9'B for exerting the spring force on an end of the spool and a plunger 9'C for exerting the load of the operation of the solenoid on another end of the spool. The balance between the feedback pressure which is applied to the other end of the spool 9'A and the spring force against the load of the plunger is used to adjust the degree of communication between an input port 9'a and an output port 9'b and the degree of communication between the output port 9'b and the drain port EX so as to regulate the solenoid pressure. To enlarge the spool stroke with respect to the width of pressure regulation so as to improve the accuracy of the pressure regulation, the reference pressure must be made to be lower than the line pressure. Thus, the input port 9'a is connected to a modulator pressure oil passage L5, the pressure of which is reduced as compared with the line pressure oil passage L1 through the solenoid modulator valve 74. As can be understood from the relationship of the spool loads, the linear solenoid valves are always-opened valves structured such that the input/output ports are brought to the communicated state owing to the spring force when the plunger load is released during off-signal period.

The other solenoid valve (SL1) having the input port connected to the modulator pressure oil passage L5 is a normally closed ON-OFF solenoid valve having input and output ports which are opened/closed. The output port is connected to a pressure receiving portion of the end of the spool of the relay valve 81 interposed in the supply oil passage of the B3-brake hydraulic pressure servo 89. The relay valve 81 incorporates a spool having a land at each of the two ends thereof and a spring for exerting spring force on one of the ends. The relay valve 81 is a switching valve having two input ports on the two sides across a central output port communicated with the B3-brake hydraulic pressure servo 89. One of the input ports is connected to the R-range oil passage L4, while the other input port is connected to the output port of the B3 control valve 80 to be described later.

The various valves concerning the fail-safe will now be described. The common structure which is a prediction for the relationship between each fail-safe valve and the hydraulic pressure servo will now be described using the clutch C-1 as the exemplary engagement element. The applied pressure (the hydraulic pressure at this time is called a "return spring pressure") in the cylinder 84A which is balanced with the spring force which acts on the piston 84B owing to the return spring 84C of the C1-clutch hydraulic pressure servo (the reference numerals here are those of the C1 clutch to easily make a reference to FIG. 9) 84 of each engagement element is the same for all of the hydraulic pressure servos (for example, 1 kg/cm$^2$). The setting is performed for the purpose of minimizing the degree of tie-up when the engagement element is interlocked. To achieve this, each fail-safe valve is structured to incorporate a spool having an end to which the spring force corresponding to the return spring pressure is exerted. When the applied pressure of the hydraulic pressure servo of one engagement element is exerted against the spring force, the load caused from the applied pressure and the spring force are balanced with each other. As a result, the applied pressure for one hydraulic pressure servo of one engagement element is higher than the return spring pressure (in a state where the piston 84B shortens the back clearance S to engage the-frictional engagement element 84D to start transmitting torque) so that the valve is operated.

Figure 10:
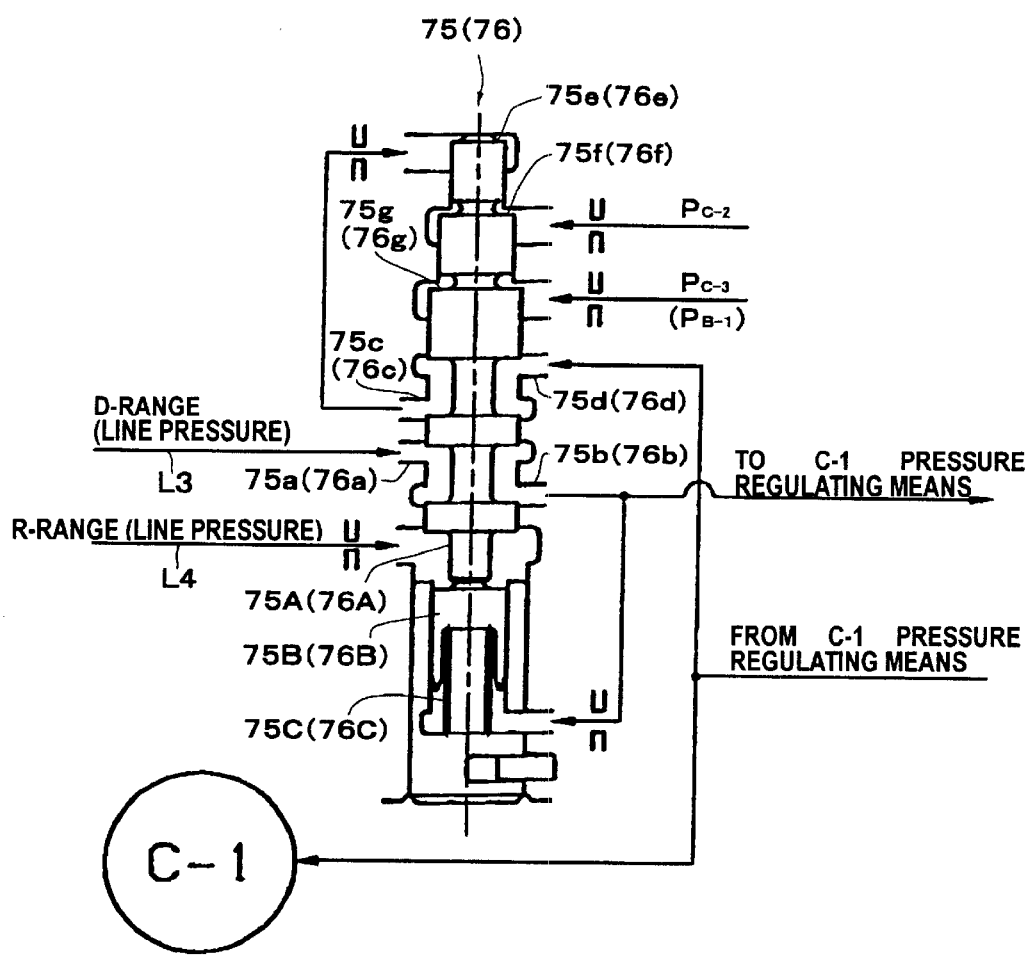
FIG. 10 is an enlarged view showing a cutoff valve of the hydraulic-pressure control apparatus.

As shown in FIG. 10 in detail, the first C1 cutoff valve 75 is a switching valve for establishing the communication between the output port 75b and the input port 75a, the communication between the input port 75a and the signal-pressure output port 75c, the communication between the signal-pressure output port 75c and the signal-pressure input port 75d and performing breakdown therebetween. The first C1 cutoff valve 75 has a structure incorporating a spool 75A having a pressure receiving portion, the diameter of which is reduced in two steps with respect to the diameter of the three switching land portions, a plunger 75B and a spring 75C for pressing the plunger against the spool 75A. The applied pressure of the C1-clutch hydraulic pressure servo 84 is applied to the spool end 75e, the applied pressure (PC-2) of the C2-clutch hydraulic pressure servo 85 is applied to the first diameter-different pressure receiving portion 75f and the applied pressure (PC-3) of the C3-clutch hydraulic pressure servo 86 is applied to the second diameter-different pressure receiving portion 75g. The structure is such that the feedback line pressure and the spring force are exerted on the rear of the plunger 75B. Moreover, the structure is such that the hydraulic pressure of the R-range oil passage L4 is applied to the portion in which the spool 75A and the plunger 75B are brought into contact with each other.

In the first C1 cutoff valve 75, the applied pressure and the line pressure of two of the three hydraulic pressure servos are balanced. That is, the product of the feedback pressure (=line pressure) and the pressure receiving area of the plunger 75B is balanced with the sum of the product of the applied pressure (=line pressure) of the C1-clutch hydraulic pressure servo 84 and the pressure receiving area of the spool end 75e in an engaged state and the product of the applied pressure (=line pressure) of the C2-clutch hydraulic pressure servo 85 and the pressure receiving area of the first diameter-different pressure receiving portion 75f in an engaged state. The applied pressure (=return spring pressure) of the C3-clutch hydraulic pressure servo 86 applied to the second diameter-different pressure receiving portion 75g and the spring force are balanced with each other. As a result, when any two of the three engagement elements C-1, C-2, C-3 are in the engaged state (in a supply state where the applied pressure has been raised to the line pressure) and the applied pressure of the other engagement element of the three engagement elements C-1, C-2, C-3 is raised to a level higher than the return spring pressure, the switching operation is performed.

Also the second C1 cutoff valve 76 has the same structure as that of the first C1 cutoff valve 75. Therefore, the reference numerals are parenthesized in FIG. 10. Also each port has substantially parallel communication relationship with respect to the first C1 cutoff valve 75. The second C1 cutoff valve 76 is disposed in series with respect to the first C1 cutoff valve 75 at a portion upstream the first C1 cutoff valve 75. The positional relationship with respect to the R-range oil passage L4 is a parallel relationship in terms of the position. The second C1 cutoff valve 76 has difference only in the structure that the applied pressure ($P_{B-1}$) of the B1 brake hydraulic pressure servo 87 is applied to the second diameter-different pressure receiving portion 76g as a substitute for the applied pressure of the C3-clutch hydraulic pressure servo 86. The operation is the same as that of the first C1 cutoff valve 75.

Figure 11:
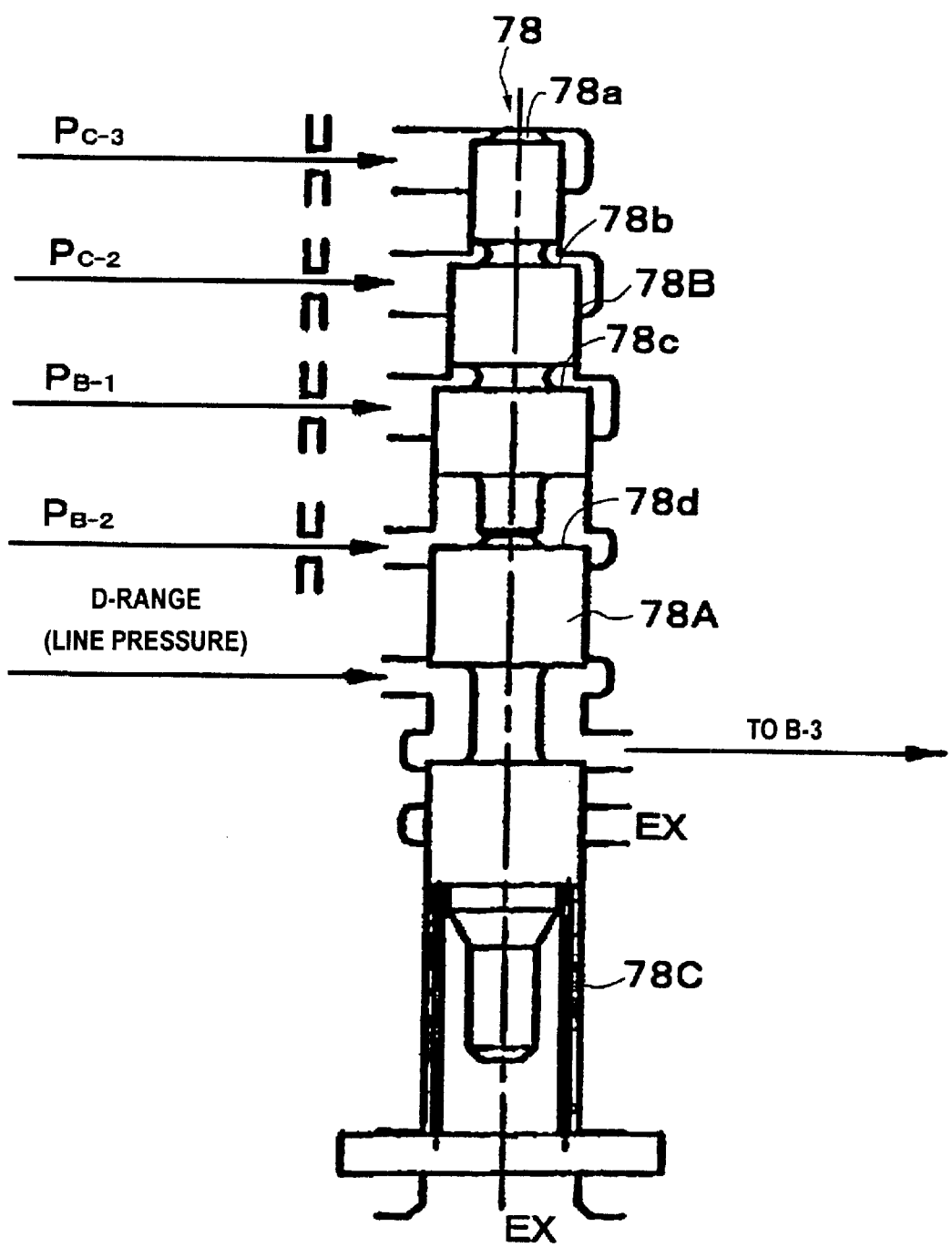
FIG. 11 is an enlarged view showing a release valve of the hydraulic-pressure control apparatus.

As shown in FIG. 11 in detail in an enlarged manner, the B3 cutoff valve 78 incorporates the spool 78A and the plunger 78B each having the difference in the diameter structured individually. A spring 78C is brought into contact with an end of the spool 78A. The spring force of the spring 78C causes the spool 78A and plunger 78B to be brought into contact with each other. The plunger 78B in the foregoing case incorporates two diameter-different pressure receiving portions 78b and 78c. The applied pressure ($P_{C-3}$) of the C3-clutch hydraulic pressure servo 86 is applied to the plunger end 78a, the applied pressure ($P_{C-2}$) of the C2-clutch hydraulic pressure servo 85 is applied to the first diameter-different portion 78b, the applied pressure ($P_{B-1}$) of the B1-brake hydraulic pressure servo 87 is applied to the second diameter-different pressure receiving portion 78c and the applied pressure ($P_{B-2}$) of the B2 brake is applied to the plunger end 78d which is in contact with the spool 78A. Only the spring force is exerted on an end of the spool 78A.

The B3 cutoff valve 78 is structured such that the return spring pressure and the spring force of one engagement element of the four engagement elements are balanced. That is, the spring force is balanced with any one of the product of the return spring pressure of the C3-clutch hydraulic pressure servo 86 and the pressure receiving area of the plunger end 78a, the product of the return spring pressure of the C2-clutch hydraulic pressure servo 85 and the area of the first diameter-different pressure receiving portion 78b, the product of the return spring pressure of the B1-brake hydraulic pressure servo 87 and the area of the second diameter-different pressure receiving portion 78c and the product of the return spring pressure of the hydraulic pressure servo 88 of the brake (B-2) and the pressure receiving area of the spool end 78d. As a result, when the hydraulic pressure applied to any one of the four engagement elements C-2, C-3, B-1, B-2 is made to be higher than the return spring pressure, the valve is operated.

The C3 apply relay valve 77 is provided to open/close the supply oil passage for the B1 control valve 94 and incorporates an input port connected to a shuttle valve 79, a spool having a pair of lands communicated with the output port connected to the B1 control valve 94 and to close the input port such that the foregoing output port is communicated with a drain and a spring for exerting spring force on an end of the spool in the direction of the communication of the input and output ports. Another end of the spool is applied with the applied pressure of the C3-clutch hydraulic pressure servo 86. The operation of the foregoing valve is similar to that of the B3 cutoff valve 78 so that when the applied pressure of the C3-clutch hydraulic pressure servo 86 is made to be not lower than the return spring pressure, the valve is closed.

As described above, each valve is structured such that the hydraulic pressure of each of the plural engagement elements is applied. Therefore, if the return spring pressure levels are different among the engagement elements, the operation of the valve is dispersed because the spring force is a fixed value. Therefore, a countermeasure against the foregoing fact is taken.

In the hydraulic pressure circuit having the above-mentioned structure, when the manual valve 73 is at the "N" position, all of the output ports are closed by the lands with respect to the input port connected to the line-pressure oil passage L1. Since all of the output ports are drained, only the modulator pressure output from the solenoid modulator valve 74, directly connected to the line-pressure oil passage L1, is output to modulator pressure oil passage L5. The throttle pressure regulated by the linear solenoid valve (SLT) such that the modulate pressure is used as the reference pressure is superimposed and applied to the pressure receiving portion of the B3 control valve 80 on which the spring force is exerted. At this time, each linear solenoid valve is in an ON-state where the solenoid pressure is not output as shown in the operation graph shown in FIG. 12. The control valves 91 to 95 are in the drain communicated state. Therefore, no hydraulic pressure is applied. Also the foregoing communication relationship is applied to the "P" position of the manual valve 73 in spite of a different spool position.

When the manual valve 73 has been shifted to the "D" position, the line pressure is output to the D-range oil passage L3. Therefore, the line pressure supply to the second C1 cutoff valve 76, the B3 cutoff valve 78, the shuttle valve 79, the C2 control valve 92 and the B2 control valve 95 is started. The line pressure supplied to the second C1 cutoff valve 76 is, by the spring force, supplied to the first C1 cutoff valve 75 owing to the communication relationship at the right-hand spool position in the drawing. Moreover, the foregoing line pressure is, by the spring force, supplied to the C1 control valve 91 owing to the communication relationship at the right-hand spool position in the drawing. The line pressure supplied to the B3 cutoff valve 78 is supplied to the B3 control valve 80 owing to the combination relationship at the right-hand spool position in the drawing. Thus, the line pressure is regulated by the B3 control valve 80 brought to the pressure regulated state owing to the application of the throttle pressure and its feedback pressure so as to be supplied to the relay valve 81. Then, the line pressure is interrupted by the relay valve 81 at the right-hand position in the drawing owing to the application of the solenoid pressure from the solenoid valve SL1. Thus, the line pressure is not supplied to the B3-brake hydraulic pressure servo 89. The line pressure interrupted by the shuttle valve 79 moves aside the check ball to the left-hand portion in the drawing. Simultaneously with the line pressure being supplied to the C3 control valve 93, the line pressure is supplied to the B1 control valve 94 through the C3 apply relay valve 77 which is moved to the right-hand spool position in the drawing by the spring force. Moreover, the line pressure is directly supplied to the C2 control valve 92 and the B2 control valve 95.

The operations of the valves in a usual state (when the solenoid valve is in a normal state) will now be described. As shown in the solenoid operation graph shown in FIG. 12, when a signal of the linear solenoid valve (SLC1) is turned off to realize the first speed in the foregoing state of communication, the C1 control valve 91 is applied with the solenoid pressure so as to be brought to the regulated state. Thus, the applied pressure is supplied to the C1-clutch hydraulic pressure servo 84. As a result, the C-1 clutch is engaged so that the first speed is realized in cooperation with the one-way clutch (F-1). At this time, the applied pressure is applied to the spool end 75e (see FIG. 10) thereof from the signal pressure input port 75d of the first C1 cutoff valve 75 through the signal pressure output port 75c and the spool end 76e (see FIG. 10) from the signal pressure input port 76d of the second C1 cutoff valve 76 through the signal pressure output port 76c. The opposing spring force and the feedback line pressure of the foregoing valves are larger than the applied pressure. Therefore, no switching takes place. At this time, the line pressure is supplied to the control valves 92 to 95 including the B3 control valve 80. Because the solenoid pressure is not output as the signal for each linear solenoid valve is turned on, the control valves 92 to 95 do not produce pressure regulated output. The B3 control valve 80 produces the regulated output owing to the application of the throttle pressure because the linear solenoid valve (SLT) is in the pressure regulated state where the throttle pressure is output. The output hydraulic pressure is interrupted by the relay valve 81 at the right-hand position in the drawing owing to the application of the solenoid pressure because the ON-OFF solenoid valve (SL1) has been turned on. Thus, the hydraulic pressure does not reach the B3-brake hydraulic pressure servo 89.

When requiring engine brake, the manual valve 73 is shifted to the "2" position. At this time, the second D-range output port only is opened and the state of communication of the oil passages is not considerably different from the state realized when the manual valve 73 is at the "D" position. In the foregoing case, the signal of the ON-OFF solenoid valve (SL1) is turned off in terms of the electric signal. Therefore, application of the solenoid pressure to the relay valve 81 is canceled. Thus, switching of the relay valve 81 to the left-hand position in the drawing causes the applied pressure supplied from the B3 control valve 80 to be supplied to the hydraulic pressure servo 89 of the B-3 brake. The relationship of the communication of the oil passages to the other hydraulic pressure servos is the same as that in a drive state. As a result, the B-3 brake is engaged. Thus, the engine brake of the first speed is realized owing to the engagement between the C-1 clutch and the B-3 brake.

The second supply oil passage is realized by turning off the signal to the linear solenoid valve (SLC1) and by turning off the signal to the linear solenoid valve (SLB2). In the foregoing state, the B2 control valve 95 is brought to the pressure regulated state in addition to the state where the applied pressure is supplied to the C1-clutch hydraulic pressure servo 84. Thus, the regulated applied pressure is supplied to the B2-brake hydraulic pressure servo 88. The applied pressure is applied in between the spool 78A and the plunger 78B of the B3 cutoff valve 78 (see FIG. 11). When the level of the pressure is higher than the return spring pressure, only the spool 78A of the B3 cutoff valve 78 is depressed to the position shown in the left-hand portion in the drawing against the spring force. As a result, the supply of the line pressure to the B3 control valve 80 is interrupted. Therefore, supply of the hydraulic pressure to the B3-brake hydraulic pressure servo 89 is interrupted before the interruption performed by the relay valve 81 positioned at the right-hand position in the drawing due to the application of the solenoid pressure caused when the ON-OFF solenoid valve (SL1) has been turned on. Thus, the second speed is realized due to the engagement of the C-1 clutch and support of the reaction of the B-2 brake through the one-way clutch (F-1).

Engine brake at the second speed is realized on the precondition that the manual valve 73 has been shifted to the "3" or "2" position. The state of communication of the oil passage is not changed from the state when the manual valve 73 is at the "D" position. When the signal to the three linear solenoid valves (SLC1, SLB1 and SLB2) is turned off, the foregoing speed is realized. In the foregoing state, the application of the solenoid pressure from the linear solenoid valve (SLB1) in addition to the state where the applied pressure in case of the second speed drive brings the B1 control valve 94 to the pressure regulated state. Thus, the regulated applied pressure is supplied to the B1 brake hydraulic pressure servo 87. The applied pressure is superimposed and applied to the second diameter-different pressure receiving portion 76g (see FIG. 10) of the second C1 cutoff valve 76. Also in the foregoing state, the second C1 cutoff valve 76 is not switched because the spring force and the feedback of the line pressure are larger. Simultaneously, the applied pressure is applied to the second diameter-different pressure receiving portion 78c of the plunger 78B (see FIG. 11) of the B3 cutoff valve 78. The movement of the plunger 78B having the end surface that receives the pressure applied to the B2-brake hydraulic pressure servo 88 is inhibited. Thus, engine brake of the second speed is realized by the engagement of the C-1 clutch and the support of the reaction of the B-1 brake. Note that the engagement of the B-2 brake does not concern the transmission of the torque for realizing engine brake as described above.

The third speed is realized by interrupting supply of the signal to the linear solenoid valve (SLC1) and interrupting supply of the signal to the linear solenoid valve (SLC3). In the foregoing case, the state where the applied pressure is supplied to the C1-clutch hydraulic pressure servo 84 is maintained. The application of the solenoid pressure from the linear solenoid valve (SLC3) brings the C3 control valve 93 to the pressure regulated state. Thus, the applied pressure is supplied to the C3-clutch hydraulic pressure servo 86. The applied pressure is applied to the end of the spool of the C3 apply relay valve 77 so as to be shifted to the position shown in the left-hand portion in the drawing. As a result, supply of the hydraulic pressure to the B1 control valve 94 is interrupted. The applied pressure to the C3-clutch hydraulic pressure servo 86 is superimposed and applied to the second diameter-different pressure receiving portion 75g (see FIG. 10) of the first C1 cutoff valve 75. Also in the foregoing case, the spring force and the load caused from the feedback of the line pressure are larger. Therefore, no shift takes place. Thus, the third speed is realized owing to the simultaneous engagement of the C-1 clutch and the C-3 clutch.

The fourth speed is realized by interrupting supply of the signal to the linear solenoid valve (SLC1) and interrupting supply of the signal to the linear solenoid valve (SLC2). In the foregoing case, the state where the applied pressure is supplied to the C1-clutch hydraulic pressure servo 84 is maintained. The application of the solenoid pressure from the linear solenoid valve (SLC2) brings the C2 control valve 92 to the pressure regulated state. Thus, the applied pressure is supplied to the C2-clutch hydraulic pressure servo 85. The applied pressure is applied to the diameter-different pressure receiving portions of the three valves which are the first and second C1 control valves 75, 76 and the B3 cutoff valve 78. The foregoing valves are not switched. Thus, the fourth speed is realized by the simultaneous engagement of the C-1 clutch and the C-2 clutch.

The fifth speed is realized by interrupting supply of the signal to the linear solenoid valve (SLC2) and interrupting supply of the signal to the linear solenoid valve (SLC3). In the foregoing case, the state where the applied pressure is supplied to the C2-clutch hydraulic pressure servo 85 and the state where the applied pressure is supplied to the C3-clutch hydraulic pressure servo 86 take place. Thus, the applied pressure to the C2-clutch hydraulic pressure servo 85 is applied to the diameter-different pressure receiving portions of the three valves which are the first and second C1 control valves 75, 76 and the B3 cutoff valve 78. Moreover, the applied pressure to the C3-clutch hydraulic pressure servo 86 is superimposed and applied to the diameter-different pressure receiving portion of the first C1 cutoff valve 75 and the end of the spool of the B3 cutoff valve 78 in the upper portion in the drawing. Also in the foregoing state, the applied pressure is not output by the C1 control valve 91. Therefore, switching of the first C1 cutoff valve 75 is not performed. Thus, the fifth speed is realized by the simultaneous engagement of the C-2 clutch and the C-3 clutch.

The sixth speed is realized by interrupting the supply of the signal to the linear solenoid valve (SLC2) and interrupting the supply of the signal to the linear solenoid valve (SLB1). In the foregoing state, the state where the applied pressure is supplied to the C2-clutch hydraulic pressure servo 85 and the state where the applied pressure is supplied to the B1 brake hydraulic pressure servo 87 are realized. The applied pressure to the C2-clutch hydraulic pressure servo 85 is applied to the diameter-different pressure receiving portions of the three valves which are the first and second C1 cutoff valves 75, 76 and the B3 cutoff valve 78. Moreover, the applied pressure to the C2-clutch hydraulic pressure servo 85 is applied to the diameter-different pressure receiving portions of the first C1 cutoff valve 75 and the B3 cutoff valve 78. Moreover, the applied pressure to the B1 brake hydraulic pressure servo 87 is applied to the diameter-different pressure receiving portions of the second C1 cutoff valve 76 and the B3 cutoff valve 78. Also in the foregoing case, the relationship with the spring force inhibits switching of the foregoing valves. Thus, the sixth speed is realized by the engagement of the C-2 clutch and support of the reaction of the B-1 brake.

Unlike the change in the electric signal when the foregoing forward gear ratio is changed, the reverse is performed such that the manual valve 73 is shifted to the "R" position. Therefore, the state of the connection of the oil passages is changed. In the foregoing case, the D-range oil passage L3 is communicated with the drain. As an alternative to this, the R-range oil passage L4 is communicated with the line-pressure oil passage L1. Thus, the line pressure is supplied from the R-range oil passage L4 to the first and second C1 cutoff valves 75, 76, the shuttle valve 79 and the relay valve 81. In the foregoing state, the check ball of the shuttle valve 79 is moved aside to the right-hand position in the drawing owing to the line pressure. Thus, the line pressure is supplied to the C3 apply relay valve 77 and the C3 control valve 93. When the supply of the signal to the linear solenoid valve (SLC3) is interrupted in the foregoing state, the application of the solenoid pressure brings the C3 control valve 93 to a pressure regulated state. Thus, the applied pressure is supplied to the C3-clutch hydraulic pressure servo 86. The applied pressure is applied to the end of the spool of the C3 apply relay valve 77 so that an action for interrupting the line pressure supply oil passage to the B1 control valve 94 occurs. On the other hand, the line pressure to the relay valve 81 is allowed to pass through the relay valve 81, which is switched when the supply of the signal to the ON-OFF solenoid valve SL1 is performed so as to be supplied to the B3-brake hydraulic pressure servo 89. Note that the portions in which the ends of the spools of the first and second C1 cutoff valves 75, 76 and the plunger are in contact with each other is applied with the hydraulic pressure of the R-range oil passage L4. Thus, only the plungers of the two valves are depressed to the left-hand position in the drawing. The foregoing operation does not concern the supply of the hydraulic pressure. The applied pressure to the C3-clutch hydraulic pressure servo 86 is applied to the end of the spool of the B3 cutoff valve 78 in the upper portion in the drawing. Thus, both of the spool and the plunger of the valve 78 are shifted to the positions in the left-hand portion of the drawing against the spring force. Also the foregoing operations do not concern the supply of the hydraulic pressure. Thus, the reverse is realized owing to the engagement of the C-3 clutch and the support of the reaction of the B-3 brake.

Then, the normal operation of the hydraulic pressure control applied pressure which is brought to the foregoing hydraulic pressure supply state (when the solenoid valve is in a normal state), which is performed in a fail state will now be described. In the foregoing case, the normally opened linear solenoid valve SLC1, SLC2, SLC3, SLB1, or SLB2 is brought to the pressure regulated state regardless of the realized gear ratio. Only the ON-OFF solenoid valve (SL1) is brought to a state where output is interrupted.

As for the state where the first speed has been realized, when the linear solenoid valve (SLC2) has been brought to the pressure regulated state, supply of the applied pressure to the C2-clutch hydraulic pressure servo 85 is started. When the linear solenoid valve (SLB2) has been brought to the pressure regulated state, supply of the applied pressure to the B2-brake hydraulic pressure servo 88 is started. When the linear solenoid valve (SLC3) has been brought to the pressure regulated state, supply of the applied pressure to the C3-clutch hydraulic pressure servo 88 is started. The corresponding C-2 clutch, the B-2 brake and the C-3 clutch are brought to the engaged state. The applied pressure to the C2-clutch hydraulic pressure servo 85 is applied to the two first diameter-different pressure receiving portions 75f and 76f (see FIG. 10) of the first C1 cutoff valve 75 and the second C1 cutoff valve 76. On the other hand, the applied pressure to the C3-clutch hydraulic pressure servo 86 is applied to the second diameter-different pressure receiving portion 75g of the first C1 cutoff valve 75. As a result, the first C1 cutoff valve 75 is brought to a state where the applied pressure to the C3-clutch hydraulic pressure servo 86 is applied to the first diameter-different pressure receiving portion 75f in a state where the applied pressure (=line pressure) to the C1-clutch hydraulic pressure servo 84 has been applied to the end 75e of the spool. Moreover, the applied pressure to the C2-clutch hydraulic pressure servo 87 is applied to the second diameter-different pressure receiving portion 75g. Therefore, the first C1 cutoff valve 75 is shifted to the left-hand position in the drawing. That is, the communication between the input port 75a and the output port 75b is interrupted. The output port 75b is communicated with the R-range oil passage L4 which is drained in the D range. The input port 75d is communicated with the end 75e of the spool. Moreover, the communication between the signal pressure input port 75d and the signal pressure output port 75c is interrupted. Therefore, the applied pressure (=line pressure) of the C1-clutch hydraulic pressure servo 84 is drained through the R-range oil passage L4 so that the C-1 clutch is released. At this time, also the feedback pressure (=line pressure) which has been applied to the rear portion of the plunger 75B is drained through the R-range oil passage L4. As an alternative to this, to the applied pressure (=line pressure) to the C1-clutch hydraulic pressure servo 84 which has been applied, the D-range pressure (=line pressure) is applied to the end 78e of the spool. Therefore, the first C1 cutoff valve 75 is applied with the applied pressures (=line pressures) of the two hydraulic pressure servos 86, 87 of the C-2 clutch and the C-3 clutch and the D-range pressure (=line pressure) is applied from the upper position in the drawing. On the other hand, only the spring force is the opposing force. Therefore, the first C1 cutoff valve 75 is able to reliably maintain the switched state where the first C1 cutoff valve 75 is reliably locked to the left-hand position in the drawing. As a result, undesirable switching can be prevented.

On the other hand, the second C1 cutoff valve 76 is brought to a state where the applied pressure to the C2-clutch hydraulic pressure servo 85 is newly applied to the first diameter-different pressure receiving portion 76f in a state where the line pressure through the first C1 cutoff valve 75 has been applied to the end 76e of the spool. Because the feedback line pressure and the spring force opposing each other are exerted on the other end of the foregoing valve, switching of the second C1 cutoff valve 76 does not take place. On the other hand, the applied pressure of the C3 clutch hydraulic pressure servo 86 is also exerted on the end of the spool of the C3 apply relay valve 77. Therefore, when the applied pressure becomes higher than the return spring pressure, the C3 apply relay valve 77 is similarly shifted to the left-hand position in the drawing. Thus, the supply of the line pressure to the B1 control valve 94 is interrupted. Therefore, the state of the pressure regulation of the linear solenoid valve (SLB1) causes the hydraulic pressure to be output from the B1 control valve 94 in a transition state where the applied pressure of the C3-clutch hydraulic pressure servo 86 is lower than the return spring pressure. However, the engagement of the B1 brake is inhibited immediately before the transmission of the torque.

In the B3 cutoff valve 78, the applied pressure of the B2-brake hydraulic pressure servo 88 is applied to the contact portion between the spool 78A and the plunger 78B. The applied pressure of the C3-clutch hydraulic pressure servo 86 is applied to the end 78a of the plunger. The first diameter-different pressure receiving portion 78b is applied with the applied pressure of the C2-clutch hydraulic pressure servo 85. The relationship of the difference in the pressure receiving area maintains the plunger 78B in the right-hand position in the drawing. Only the spool 78A is shifted to the left-hand position in the drawing. As a result, the supply of throttle pressure to the B3 control valve 80 is interrupted. Note that the supply of the applied pressure to the B3-brake hydraulic pressure servo 89 which has been inhibited by the relay valve 81 is switched to a state where the supply of the hydraulic pressure to the B3 cutoff valve 78 is interrupted. As a result, when a fail state has been realized at the first speed, the simultaneous engagement of the C-2 clutch and the C-3 clutch takes place. As shown in the engagement graph of FIG. 2, the gear train is shifted to the state where the fifth speed has been realized.

When a fail state has been realized in the embodiment state of the first speed, the difference is the fact that the B3-brake hydraulic pressure servo 89 is in the state where the line pressure is supplied. As a result of the foregoing process, the supply of the line pressure to the B3 control valve 80 is inhibited by the B3 cutoff valve 78. Therefore, the state similar to the failure occurring in the first drive state is realized. The fifth speed, thus, is realized in the foregoing case.

In case of a failure occurring in the second speed state, the B2-brake hydraulic pressure servo 88 is in the state where the line pressure is supplied as compared with the state of the first drive. The difference is only the fact that the spool 78A of the B3 cutoff valve 78 which has been shifted to the left-hand position in the drawing. Therefore, supply of the line pressure to the B3 control valve 80 is inhibited from the start. The operations of the first and second C1 cutoff valves 75, 76 and the C3 apply relay valve 77 are similar to that which is performed in case of the failure occurring in the first drive state. The fifth speed, thus, is realized in the foregoing state.

In case of a failure occurring in the state where the third speed has been realized, supply of the applied pressure to the C2-clutch hydraulic pressure servo 85 is started. Thus, the applied pressure to the C2-clutch hydraulic pressure servo 85 is applied to the first C1 cutoff valve 75 which is in a state where the end 75e of the spool and the second diameter-different pressure receiving portion 75f have been applied with the line pressure of the C3-clutch hydraulic pressure servo 86. Moreover, the applied pressure is applied to the first diameter-different pressure receiving portion 76f of the second C1 cutoff valve 76 having the end 76e of the spool to which the line pressure of the C3-clutch hydraulic pressure servo 86 has been applied. Therefore, when the applied pressure is higher than the return spring pressure, the shift of the first C1 cutoff valve 75 to the right-hand position in the drawing takes place. The operations of the first and second C1 cutoff valves 75, 76 which are performed afterwards are the same as the operations which are performed in the state of the failure occurring in the first drive state. Also in the foregoing case, tie-up due to overlapping of the engagement of the C-2 clutch and the release of the C-1 clutch at the timing of the switching of the first C1 cutoff valve 75 can be prevented. As a matter of course, the fifth speed is realized in the foregoing case.

In case of a failure occurring in the state where the fourth speed has been realized, only the supply of the applied pressure to the C3-clutch hydraulic pressure servo 86 changes the initial state with respect to the relationship of application of the hydraulic pressure. In the foregoing case, the supply of the applied pressure to the B1 brake hydraulic pressure servo 87 is inhibited by the C3 cutoff valve 77 which is switched when the applied pressure to the C3-clutch hydraulic pressure servo 86 is higher than the return spring pressure. As for the supply of the applied pressure to the C1-clutch hydraulic pressure servo 84, the first C1 cutoff valve 75 having the end 75e of the spool to which the line pressure of the C1-clutch hydraulic pressure servo 84 has been applied and the first diameter-different pressure receiving portion 75f to which the line pressure of the C2-clutch hydraulic pressure servo 85 has been applied is brought to the state where the second diameter-different pressure receiving portion 75g is applied with the applied pressure to the C3-clutch hydraulic pressure servo 86. Therefore, when the applied pressure is made higher than the return spring pressure, shift to the left-hand position in the drawing takes place. Thus, tie-up occurring when changing the clutch between the C-1 clutch and the C-3 clutch can be prevented. The change in the application of the hydraulic pressure to the second C1 cutoff valve 76 and the B3 cutoff valve 78 does not influence operation of the valves. Thus, the fifth speed is realized in the fail state at the fourth speed.

In a case of a failure at the fifth speed, the difference is the linear solenoid valve SLC1 and the linear solenoid valve SLB1 are brought to the pressure regulated state. The solenoid pressure is applied to the C1 control valve 91 and the B1 control valve 94. When the foregoing state has been realized, the applied pressure of the C1 control valve 91 is applied to the end 75e of the spool of the first C1 cutoff valve 75. The applied pressure is superimposed on the line pressure of the C2-clutch hydraulic pressure servo 85 applied to the first diameter-different pressure receiving portion 75f and the line pressure of the C3-clutch hydraulic pressure servo 86 applied to the second diameter-different pressure receiving portion 75g. Therefore, when the applied pressure to the C1-clutch hydraulic pressure servo 84 is made higher than the return spring pressure, a shift to the left-hand position in the drawing takes place. The supply of the line pressure is inhibited by the first C1 cutoff valve 75 so that the output of the hydraulic pressure from the C1 control valve 91 that lacks the reference pressure is inhibited. On the other hand, the line pressure which serves as the reference pressure for the B1 control valve 94 has been inhibited from the beginning by the C3 apply relay valve 77. Therefore, the applied pressure is not supplied to the B1 brake hydraulic pressure servo 87. The fifth speed, thus, is kept unchanged in the foregoing case.

Finally, in case of a failure at the sixth speed, supply of the applied pressure to the C1-clutch hydraulic pressure servo 84 and supply of the applied pressure to the C3-clutch hydraulic pressure servo 86 are started in the initial state. The applied pressure to the C3-clutch hydraulic pressure servo 86 is applied to the end of the spool of the C3 apply relay valve 77 and the second diameter-different pressure receiving portion 75g of the first C1 cutoff valve 75. When the applied pressure is made higher than the return spring pressure, the C3 apply relay valve 77 is shifted to the left-hand position in the drawing. Thus, the supply of the line pressure to the B1 control valve 94 is interrupted. Thus, the engagement of the B1 brake which causes the transmission of the torque is prevented. Also the first C1 cutoff valve 75 is shifted to the left-hand position in the drawing. Also the supply of the line pressure to the C1 control valve 91 is interrupted. As a result, the engagement which causes the transmission of the torque of the C1 brake is prevented. In the foregoing case, the fifth speed is realized.

In case of a failure at the reverse state, no line pressure is supplied to the D-range oil passage L3. Therefore, interruption of the supply of the hydraulic pressure to the C3-clutch hydraulic pressure servo 86 and that of the supply of the line pressure to the B1 control valve 94 are performed by the output of the applied pressure from the C3 control valve 93 to which the line pressure is supplied from the R-range oil passage L4. Note that supply of the R-range pressure to the B3-brake hydraulic pressure servo 89 is performed through an individual oil passage (not shown). As a result, the reverse state is maintained during the reverse failure.

FIG. 13 is a table showing the relationship between the fail-safe valves and the supply of hydraulic pressure to each of the engagement elements. The first C1 cutoff valve 75 drains the C1-clutch hydraulic pressure servo 84 when the hydraulic pressure is supplied to the C1-clutch, C2-clutch and the C3-clutch hydraulic pressure servos. The second C1 cutoff valve 76 drains the C1-clutch hydraulic pressure servo 84 when the hydraulic pressure is supplied to the C-1 clutch, the C-2 clutch and the B-1 brake hydraulic pressure servos. The B3 cutoff valve 78 drains the supply of the hydraulic pressure to the B3 brake hydraulic pressure servo when the hydraulic pressure is supplied to the hydraulic pressure servo any one of the engagement elements, which are the C-2 clutch, the C-3 clutch, the B-1 brake, and the B-2 brake. The C3 apply relay or cutoff valve 77 drains the B1 brake hydraulic pressure servo 87 when the hydraulic pressure is supplied to the C3-clutch hydraulic pressure servo 86. Thus, the hydraulic pressure circuit according to the first embodiment causes the C-2 clutch, the C-3 clutch and the B-2 brake (note that no torque is transmitted) to be brought to engagement when all of the linear solenoid valve valves are turned off owing to a failure of the signal at each of the forward gear ratios. Therefore, interlocking caused by the tie-up of the engagement elements can be prevented, realizing the fifth speed.

Figure 14:
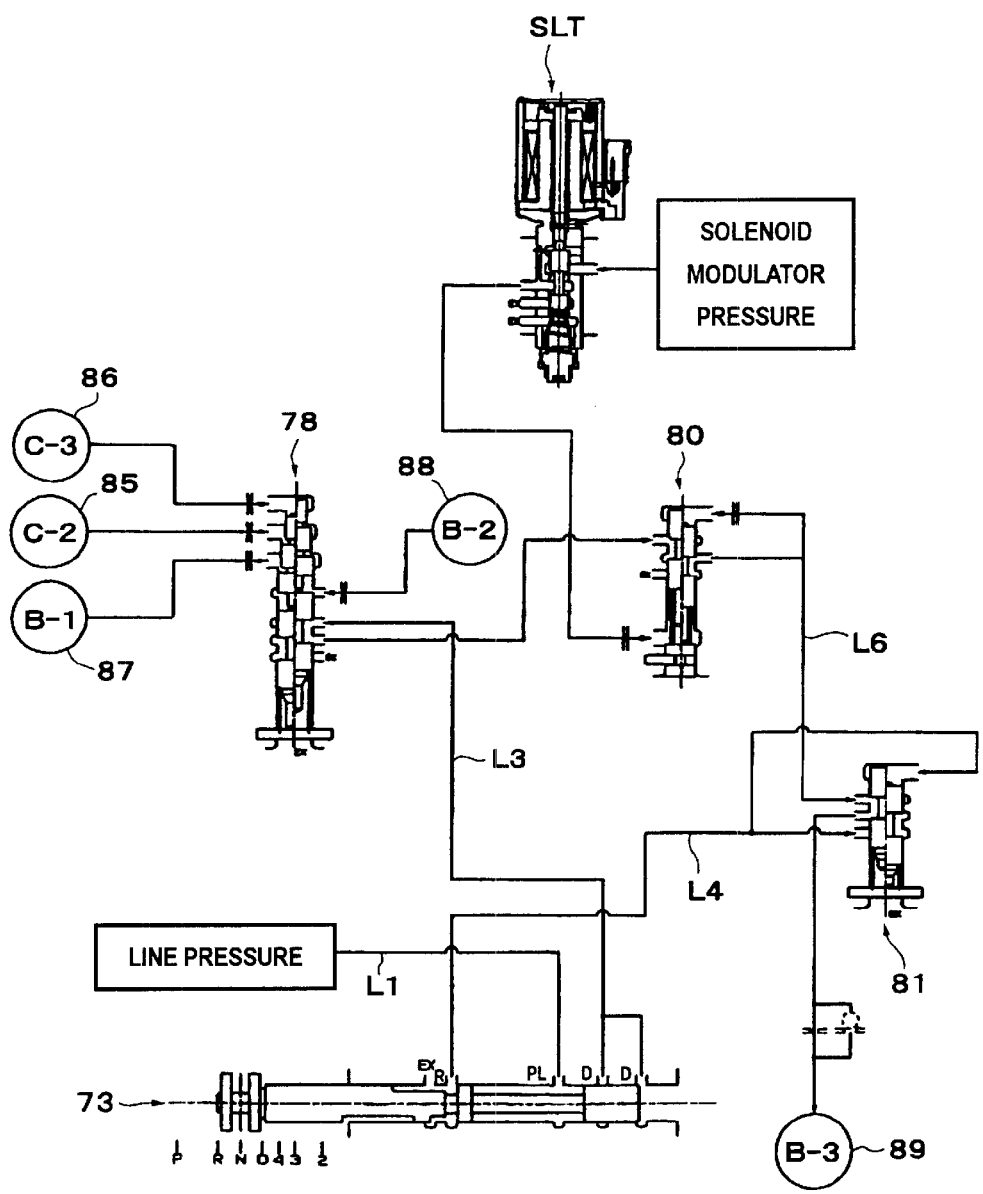
FIG. 14 is a partial hydraulic pressure circuit diagram according to a first modification obtained by changing a portion of the hydraulic-pressure control apparatus.

FIG. 14 shows a first modification of the supply of the hydraulic pressure to the B3-brake hydraulic pressure servo 89. In the foregoing case, the hydraulic pressure of the R-range oil passage L4 is directly applied to the end of the spool of the relay valve 81. Thus, the ON-OFF solenoid valve SL1 is omitted. The other relationship of the connection is the same as that according to the first embodiment. Therefore, the corresponding elements are given the same reference numerals and the corresponding elements are omitted from description. In the foregoing case, the applied pressure is supplied through the B3 control valve 80 similarly to the first embodiment when the forward gear ratio has been realized such that the line pressure of the D-range oil passage is used as the reference pressure. The line pressure from the R-range oil passage at the time of the reverse state is directly supplied to the B3-brake hydraulic pressure servo 89.

Figure 15:
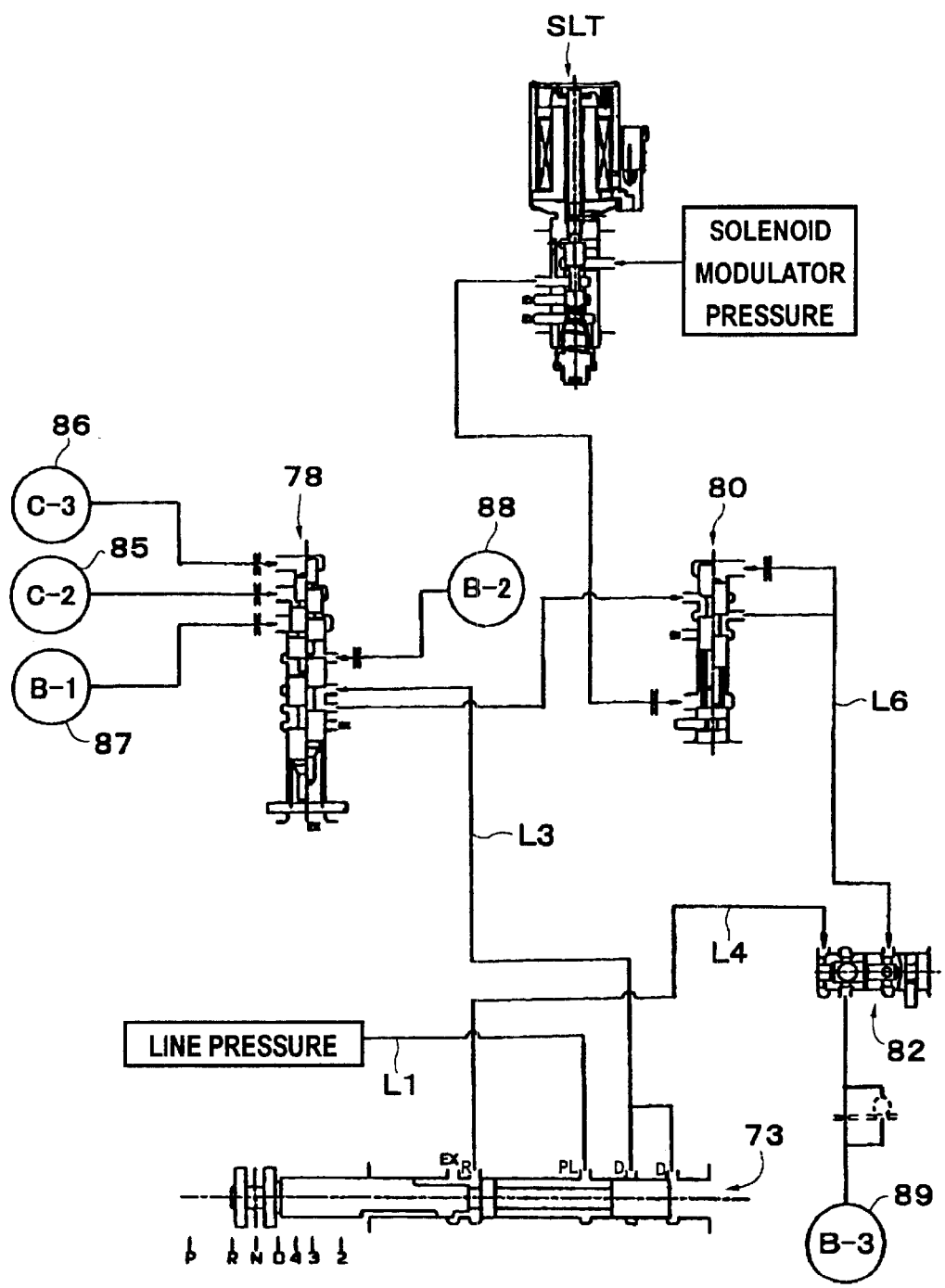
FIG. 15 is a partial hydraulic pressure circuit diagram according to a second modification obtained by furthermore changing a portion of the hydraulic-pressure control apparatus.

FIG. 15 shows a second modification employing a shuttle valve 82 as a substitute for the relay valve 81 according to the first modification. In the foregoing case, the two input ports of the shuttle valve 82 are connected to the output port of the B3 control valve 80 and the R-range oil passage L4, respectively. The output port is connected to the B3-brake hydraulic pressure servo 89. The other relationship of the connection is the same as that according to the first modification. Therefore, the corresponding elements are given the same reference numerals and the corresponding elements are omitted from description. In this modification, when the applied pressure is supplied through the B3 control valve 80 while realizing the forward gear ratio in a state where the line pressure of the D-range oil passage is used as the reference pressure, the check ball is pushed to the left-hand position in the drawing. Thus, the input port adjacent to the R-range oil passage L4 is closed, causing the apply pressure to automatically be supplied to the B3-brake hydraulic pressure servo 89. When the line pressure of the R-range oil passage L4 is supplied in the reverse state, the check ball is pushed to the right-hand position in the drawing. Thus, the input port adjacent to the B3 control valve 80 is closed, causing the line pressure to automatically be supplied to the B3-brake hydraulic pressure servo 89.

Figure 16:
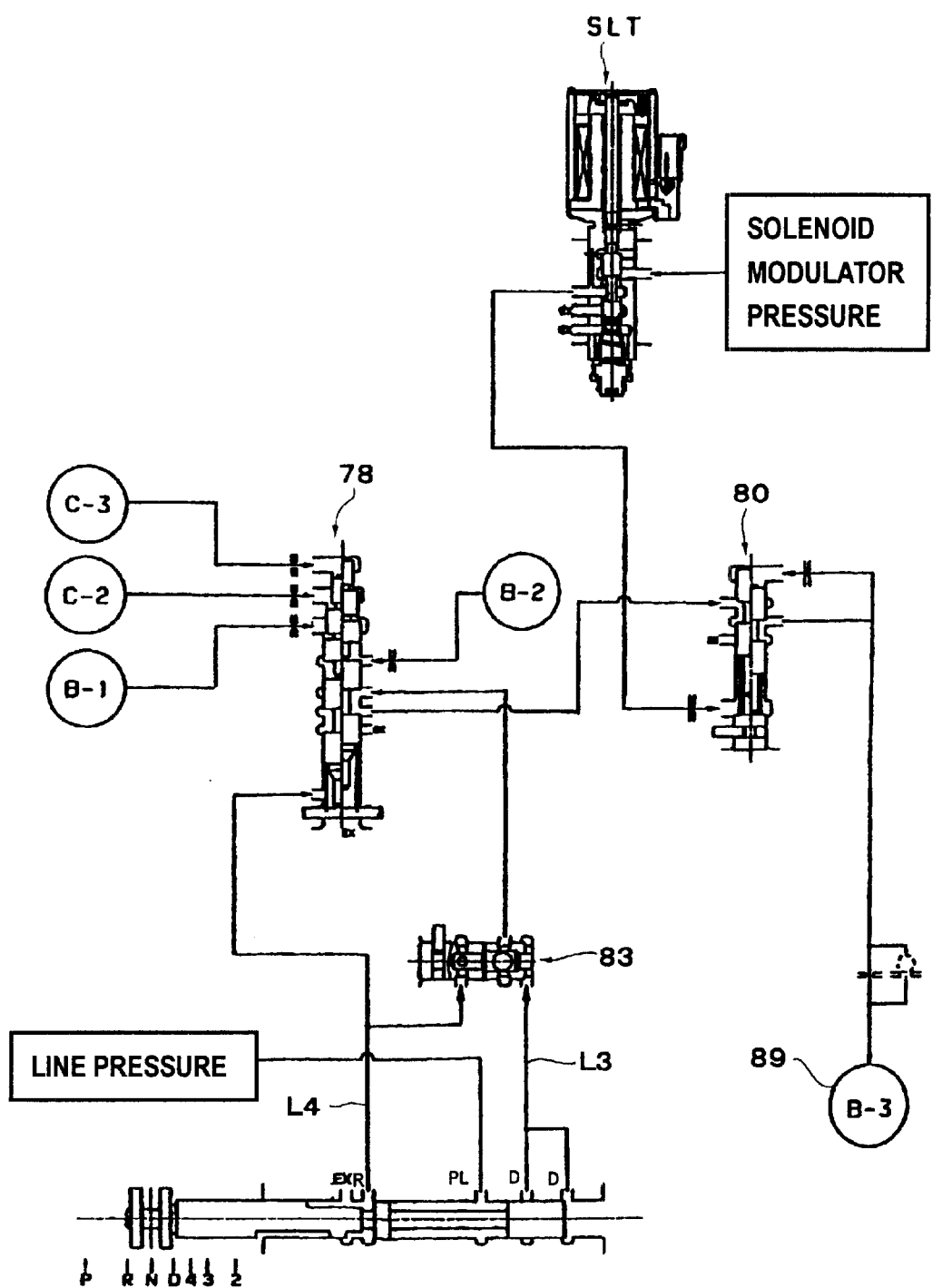
FIG. 16 is a partial hydraulic pressure circuit diagram according to a third modification obtained by furthermore changing a portion of the hydraulic-pressure control apparatus.

FIG. 16 shows a third modification in which the oil supply passages to the B3-brake hydraulic pressure servo 89 are unified. Moreover, switching of the supply of the line pressure from the D-range oil passage L3 and the R-range oil passage L4 is performed at a position upstream to the B3 cutoff valve 78. In the foregoing case, a shuttle valve 83 serves as the switching means. The two input ports of the shuttle valve 83 are connected to the D-range oil passage L3 and the R-range oil passage L4, respectively. The output port is connected to the input port of the B3 cutoff valve 78. Moreover, the R-range oil passage L4 is connected to an end port of the spool 78A of the B3 cutoff valve 78 illustrated at a lower position in the drawing. The foregoing structure is employed in the following case: when the applied pressure to the C-3 clutch which is engaged when the reverse state has been realized is made to be not lower than the return spring pressure, the B3 cutoff valve 78 is usually shifted to the left-hand position in the drawing against the spring force. Thus, the supply of the line pressure to the B3 control valve 80 is undesirably interrupted. The R-range pressure (=line pressure) is applied from a position below the B3 cutoff valve 78 in the drawing against the applied pressure to the C-3 clutch. Thus, if the applied pressure (=line pressure) is applied to the C-3 clutch, switching of the B3 cutoff valve 78 is inhibited. Therefore, the reverse state can be reliably realized. Because the foregoing structure is such that the applied pressure of the C-3 clutch is balanced by only the spring force, a need to individually provide the spool for applying the R-range pressure can be eliminated. Thus, the manufacturing cost can be reduced. As the other relationship of the connection is the same as that according to each of the foregoing modifications, the corresponding elements are given the same reference numerals and the corresponding elements are omitted from description. In the third modification, the line pressure to be applied to the B3 control valve 80 is switched between the forward state and the reverse state. Moreover, the applied pressure to be supplied to the B3-brake hydraulic pressure servo 89 is always regulated by the B3 control valve 80.

Figure 17:
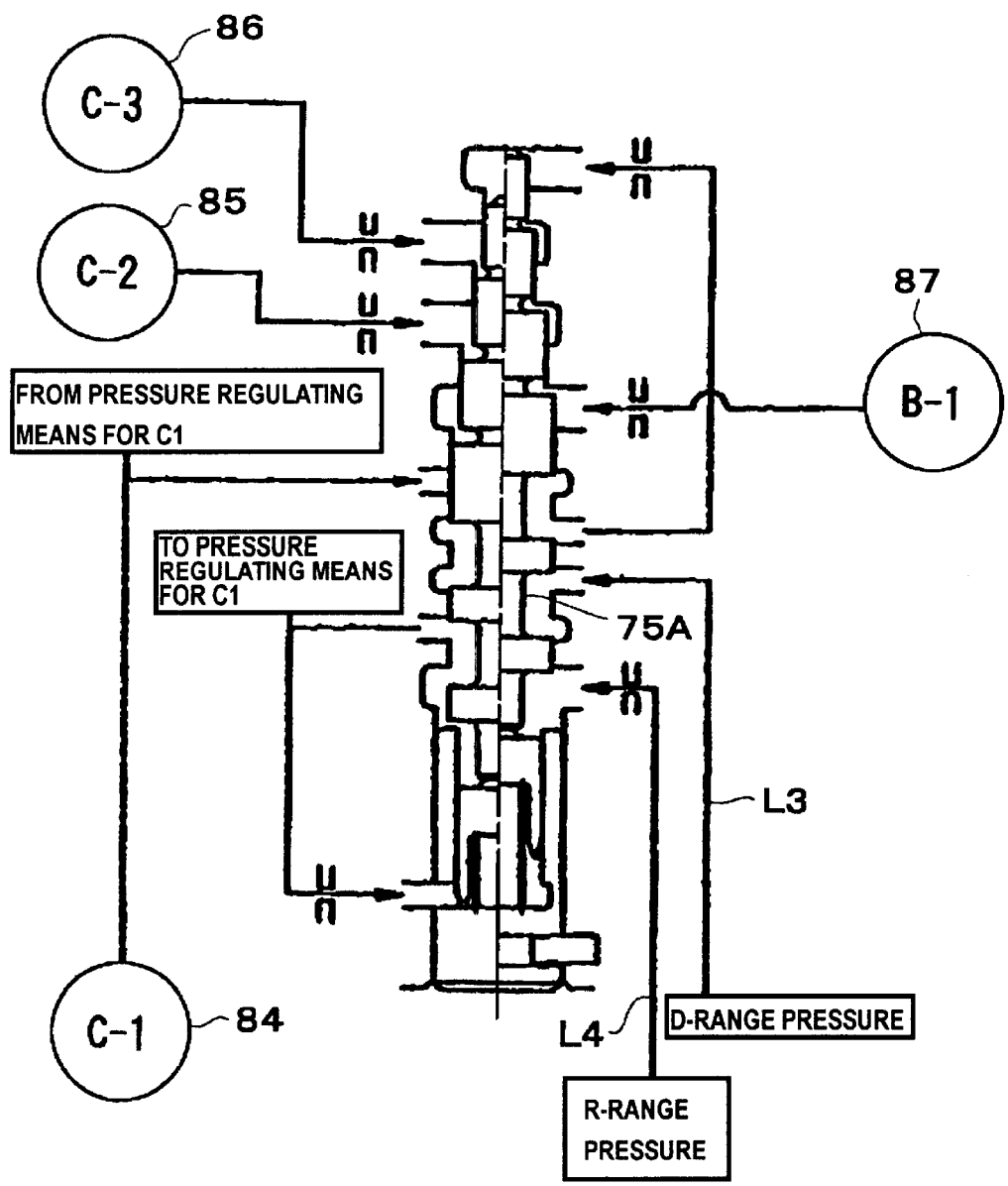
FIG. 17 is a partial hydraulic pressure circuit diagram according to a fourth modification obtained by unifying cutoff valves of the fail-safe valve.

FIG. 17 shows a fourth modification in which the first and second C1 cutoff valves 75, 76 according to the first embodiment are unified. In this fourth modification, all of the applied pressure of the C3-clutch hydraulic pressure servo 86, the applied pressure of the C2-clutch hydraulic pressure servo 85 and the applied pressure of the B1 brake hydraulic pressure servo 87, which are divided between the two valves 75, 76 in the first embodiment, are applied to only one valve. As the foregoing change in the structure is employed, the diameter-different pressure receiving portion of the spool 75A is formed into three-stage structure. Therefore, the overall body of the spool 75A has four outer diameter portions. Therefore, precise machining is required to maintain the accuracy of the coaxiality among the outer diameter portions. However, the number of the elements of the circuit can be effectively reduced.

Figure 18:
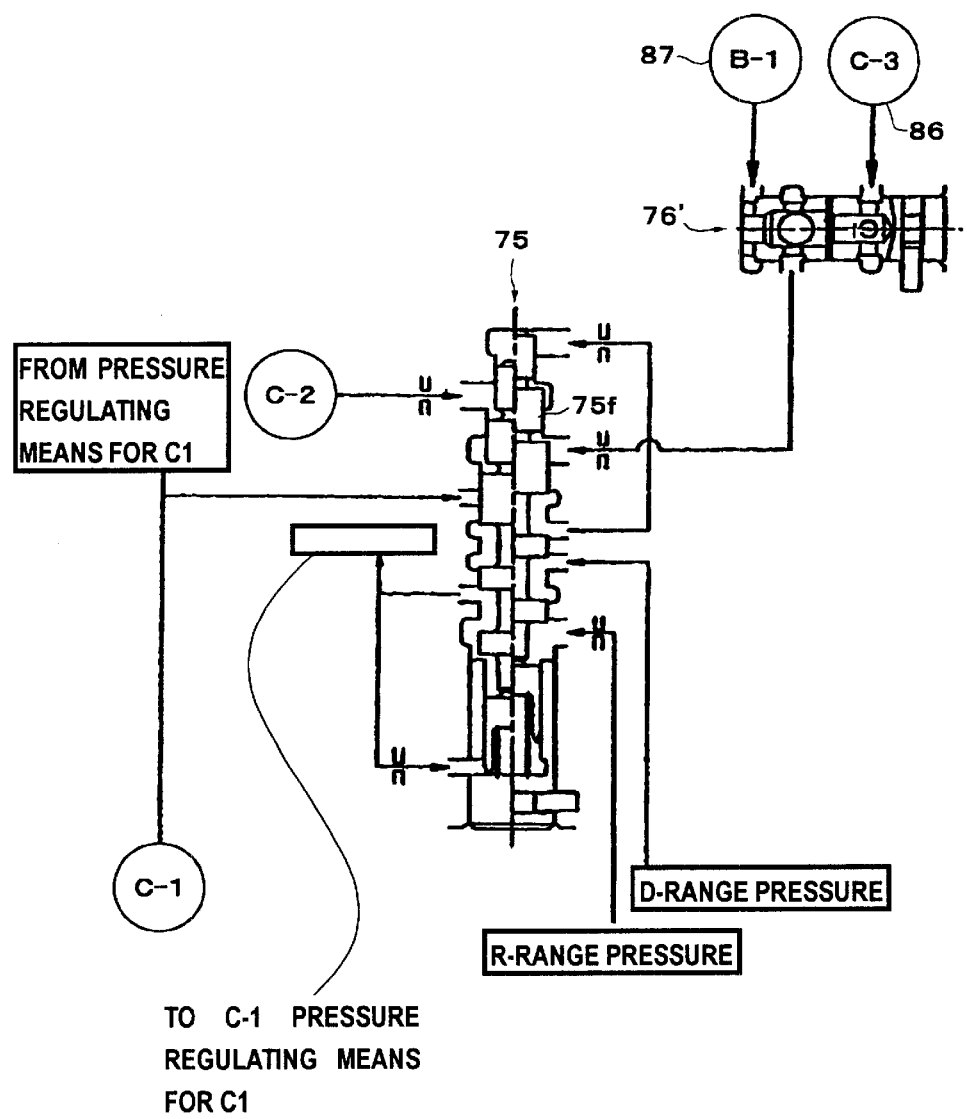
FIG. 18 is a partial hydraulic pressure circuit diagram according to a fifth modification obtained by unifying the cutoff valves by another method.

FIG. 18 shows a fifth modification in which the first and second C1 cutoff valves are unified by another method. This modification in the structure is a compromise between the basic first embodiment and the fourth modification. A low-cost shuttle valve 76' is employed as a substitute for either one of the cutoff valves according to the first embodiment. As an alternative to this, the shuttle valve 76' is employed as a substitute for complicated machining to increase the diameter-different pressure receiving portions according to the fourth modification. Because the foregoing structure is employed, the second diameter-different pressure receiving portion 75f may serve as a common pressure receiving portion for receiving the applied pressure of the B1 brake hydraulic pressure servo 87 and the C3-clutch hydraulic pressure servo 86. As a result, similar functionality to that obtained to by the first embodiment and the fourth modification can be obtained. Moreover, the machining requirements can be reduced with a resultant cost reduction.

Figure 19:
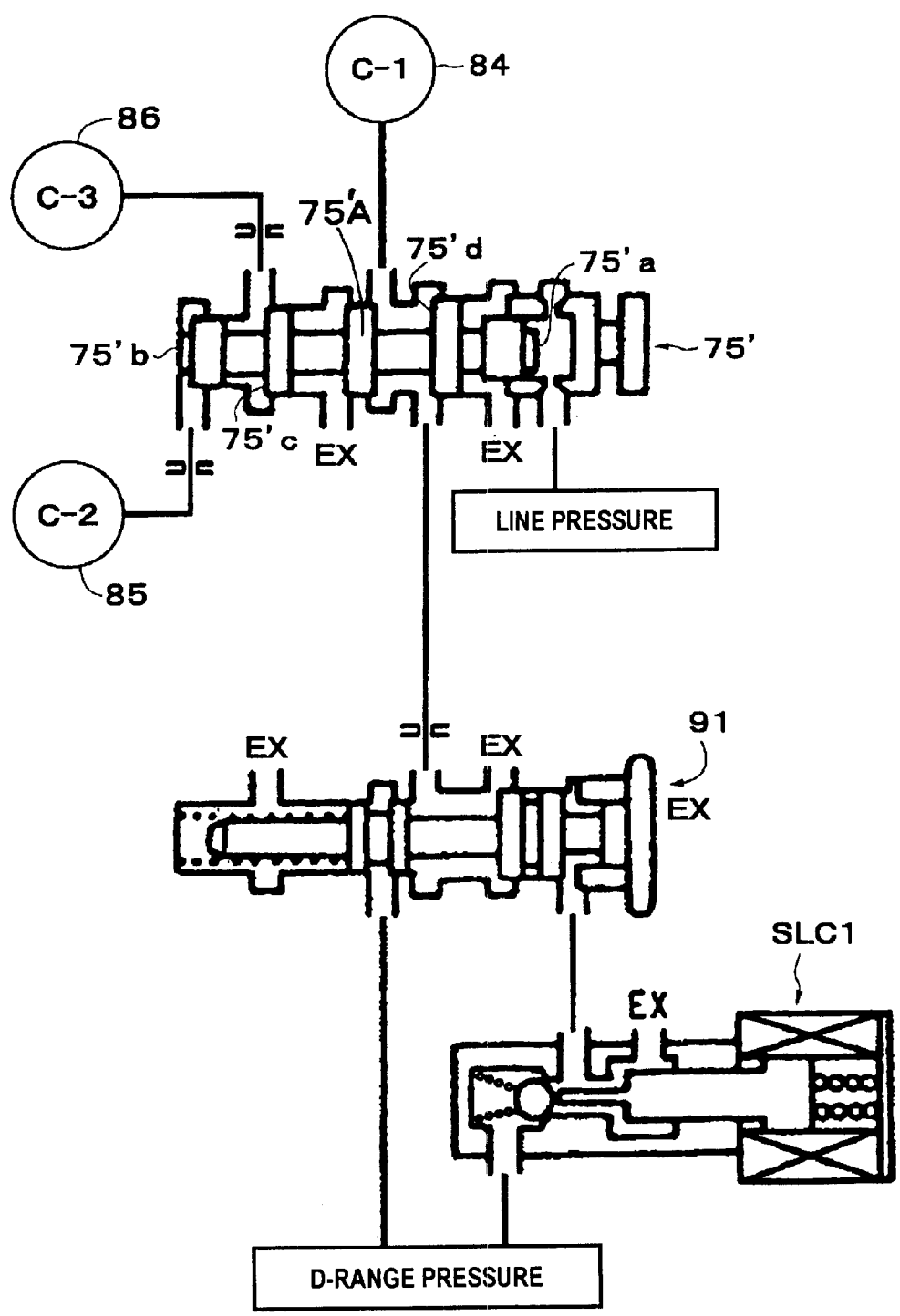
FIG. 19 is a partial hydraulic pressure circuit diagram according to a sixth modification obtained by unifying the cutoff valves by another method.

FIG. 19 shows a sixth modification in which the C1 cutoff valves 75, 76 are unified by another method. In this modification, the C1 cutoff valve 75' can be switched by using only the difference in the pressure receiving areas with no spring. That is, the spool 75' A of the C1 cutoff valve 75' has the diameter difference 75'd provided for the switching land portion as well as the diameter-different pressure receiving portion. The own applied pressure is always applied to oppose the line pressure which is applied to an end 75'a of the spool 75' A. The pressure of the C2-clutch hydraulic pressure servo 85 is applied to end 75'b of the spool 75'A, the pressure of the C3-clutch hydraulic pressure servo 86 is applied to the diameter-different pressure receiving portion 75'c, and the pressure of the C1-clutch hydraulic pressure servo 84 is applied to the different-diameter pressure receiving portion 75'd so that the applied pressures oppose the line pressure at end 75'a. In this modification, when the relationship of the pressure receiving area with which the two applied pressures (=line pressures) and the force of the other applied pressure corresponding to the return spring pressure are larger than the opposing line pressure, the valve is switched. Thus, tie-up caused by engagement of the three clutches and the resultant interlocking can be prevented. Although a duty solenoid valve SLC1 and the C1 control valve 91 shown in the drawing are different from those according to the foregoing modifications in their specific structure, they have similar functions.

The first embodiment and its modifications have the basic control structure to cope with a failure such that the C-2 clutch is given priority (engaged) as compared with the C-1 clutch. On the contrary, the C-1 clutch may be given priority (engaged) as compared with the C-2 clutch. FIG. 20 shows a second embodiment established on the basis of the C-1 clutch given priority and as distinct from the first embodiment in that the third speed is realized in case of a failure. When the foregoing structure is employed, the hydraulic pressure control unit is structured as shown in the circuit diagram shown in FIG. 8 such that the hydraulic pressure servos 84, 85 of the C-1 clutch and the C-2 clutch are interchanged. The corresponding linear solenoid valves SLC1 and SLC2 and the control valves 91, 92 are interchanged. Thus, the applied pressure to the C1-clutch hydraulic pressure servo 84 causes the applied pressure of the C2-clutch hydraulic pressure servo 85 to be drained. The applied pressure is supplied to the B1 brake hydraulic pressure servo 87 similar to the way in the first embodiment by supplying the applied pressure to the C3-clutch hydraulic pressure servo 86. Therefore, a gear ratio, in which the C-1 clutch is engaged as a substitute for the C-2 clutch in case of a failure and simultaneously the C-3 clutch is engaged, that is, the third speed is realized.

The foregoing structure is such that the invention is applied to the vertical automatic transmission having two one-way clutches and six engagement elements. The invention may be applied to an automatic transmission in which one of the one-way clutches is omitted and five engagement elements are employed to realize similar gear ratios. A third embodiment having the foregoing structure will now be described.

FIG. 21 is a schematic drawing showing a gear train of an automatic transmission according to the third embodiment. The automatic transmission is formed into a trans-axle for a front-engine front-drive (FF) or rear-engine rear-drive (RR) vehicle having three axles in which the main shaft X, the counter shaft Y and the differential shaft Z are disposed in parallel with one another. A torque converter 4 provided with a lockup clutch and a planetary gear transmission mechanism 1 are disposed on the main shaft X. A counter gear mechanism 2 is disposed on the second shaft. A differential unit 3 is disposed on the third shaft. The automatic transmission is connected to an engine (not shown) through the torque converter 4 disposed in the front portion on the power transmission passage with respect to the planetary gear transmission mechanism 1. Moreover, the automatic transmission is connected to the lateral axle (not shown) through the counter gear mechanism 2 and the differential unit 3 disposed in the rear portion on the power transmission passage.

The structure of the gear train according to this embodiment is substantially similar to that of the first embodiment. Because the horizontal structure is employed, a counter drive gear 19A is employed as the output member as a substitute for the output shaft 19. However, the one-way clutch (F-1), in parallel with the B-1 brake, and the B-2 brake, which causes the engagement of the one-way clutch (F-1) to be effective, are omitted. Because the names of the brakes and the one-way clutches are shifted, the one-way clutch (F-2) according to the first embodiment is called one-way clutch (F-1) in this embodiment. Moreover, the B-2 brake of this embodiment is substituted for the B-3 brake of the first embodiment. Thus, further description of the structure of the gear train and its operation is omitted here as they would be understood by one skilled in the art in view of the detailed description of the first embodiment.

The engagement elements and the realized gear ratios are shown in FIG. 22. As for the speed graph showing the transmission elements which are engaged by the engagement elements and the resultant speed ratios of the gear ratios, they are similar to that shown in FIG. 3 when the B-2 brake is substituted for the B-3 brake.

In the structure of the gear train, the combinations of the engagement of the two engagement elements are, shown in FIG. 23, reduced and ten combinations are realized. Also the combinations of three engagement elements are, as shown in FIG. 24, ten combinations. As shown in FIGS. 25 and 26, the combinations (7)–(10) of two engagement elements and-the combinations (1) and (2) of three engagement elements must be inhibited.

The hydraulic pressure circuit is structured such that the hydraulic pressure servo 88 of the brake (B-2), the linear solenoid valve (SLB2) for supplying the hydraulic pressure to the B2-brake hydraulic pressure servo 88 and the B2 control valve 95, including their oil passages, are omitted from the circuit shown in FIG. 8.

The three embodiments and modifications of the invention are structured as described. The idea of the invention is not limited to the described hydraulic pressure circuit. The invention may widely be applied to hydraulic pressure control circuits.

What is claimed is:
1. A hydraulic pressure control apparatus for an automatic transmission including a planetary gear transmission mechanism incorporating at least five engagement elements arranged to be selectively engaged to realize a predetermined gear ratio; and a hydraulic-pressure control apparatus for controlling the engagement elements of the transmission mechanism, wherein
when a first engagement element and a fourth engagement element are engaged, a first speed is realized;
when the first engagement element and a fifth engagement element are engaged, a second speed is realized;
when the first engagement element and a third engagement element are engaged, a third speed is realized;
when the first engagement element and a second engagement element are engaged, a fourth speed is realized;
when the second engagement element and the third engagement element are engaged, a fifth speed is realized; and
when the second engagement element and the fifth engagement element are engaged, a sixth speed is realized,
the hydraulic-pressure control apparatus further comprising a plurality of valves for inhibiting certain combinations of engaged engagement elements with which interlocking of the transmission mechanism occurs due to engagement of two or more engagement elements of the five engagement elements when each of forward gear ratios including the first speed to the sixth speed has been realized, wherein the combinations with which interlocking of the transmission mechanism occurs when the forward gear ratio has been realized and which are inhibited incorporate a first pattern having combinations of two engagements and a second pattern having combinations of three engagements,
the first pattern at least incorporates combinations of engagements between the second engagement element and the fourth engagement element, between the third engagement element and the fifth engagement element, between the third engagement element and the fourth engagement element and between the fourth engagement element and the fifth engagement element,
the second pattern incorporates a combination of engagements among the first engagement element, the second engagement element and the third engagement element and a combination among the first engagement element, the second engagement element and the fifth engagement element, and
at least one valve of the plurality of valves inhibits at least six combinations.
2. The hydraulic pressure control apparatus for an automatic transmission according to claim 1, wherein
the planetary gear transmission mechanism incorporates a planetary gear for inputting reduced speed and a planetary gear set for inputting reduced revolutions from the planetary gear for inputting the reduced speed,
the first engagement element is a first clutch for inputting the reduced revolutions to a first transmission element,
the second engagement element is a second clutch for inputting revolutions input from an engine to a second transmission element,
the third engagement element is a third clutch for inputting reduced revolutions to a third transmission element of the planetary gear,
the fourth engagement element is a first brake for fixing the second transmission element of the planetary gear, and the fifth engagement element is a second brake for fixing the third transmission element of the planetary gear.

3. The hydraulic pressure control apparatus for an automatic transmission according to claim 1, wherein
each of the engagement elements is provided with pressure regulating means for regulating the hydraulic pressure supplied from a hydraulic pressure source,
supply/discharge of the hydraulic pressure regulated by the pressure regulating means causes engagement/release to be performed, and
at least one valve of the plurality of valves is operated due to supply of the hydraulic pressure to a predetermined engagement element.

4. The hydraulic pressure control apparatus for an automatic transmission according to claim 1, wherein
the third engagement element and the fourth engagement element are separately engaged when various forward gear ratios are realized are both engaged when a reverse gear ratio is realized,
the combination which is inhibited when a forward gear ratio has been realized incorporates a combination of the third engagement element and the fourth engagement element, and
means is provided which supplies hydraulic pressure to the fourth engagement element when the reverse gear ratio has been realized.

5. The hydraulic pressure control apparatus for an automatic transmission according to claim 4, wherein
a first passage through which the hydraulic pressure is, through a valve of the plurality of valves, supplied to the fourth engagement element arranged to be engaged when the forward gear ratio has been realized or when the reverse gear ratio has been realized and a second passage through which the hydraulic pressure is supplied without passage through the valve of the plurality of valves are provided, and
the means for supplying the hydraulic pressure is the second passage.

6. The hydraulic pressure control apparatus for an automatic transmission according to claim, 5, wherein
communication of the first passage and that of the second passage with the fourth engagement element are permitted through a switching valve, and
the switching valve is disposed between the valve of the plurality of valves and the fourth engagement element.

7. The hydraulic pressure control apparatus for an automatic transmission according to claim 6, wherein
the switching valve can be operated by a solenoid valve so that selective communication between the first passage or the second passage with the fourth engagement element is permitted.

8. The hydraulic pressure control apparatus for an automatic transmission according to claim 6, wherein
the switching valve can be operated with the hydraulic pressure which acts when the reverse gear ratio has been realized so that when the hydraulic pressure is acted, the first passage and the fourth engagement element are disconnected from each other and the second passage and the fourth engagement element are communicated with each other.

9. The hydraulic pressure control apparatus for an automatic transmission according to claim 6, wherein
the switching valve is a check valve, and
communication of the check valve with the fourth engagement element is permitted due to the hydraulic pressure supplied through the first passage or the second passage.

10. The hydraulic pressure control apparatus for an automatic transmission according to claim 4, wherein
a valve of the plurality of valves is disposed between the means for supplying the hydraulic pressure, which is a hydraulic pressure source, and the fourth engagement element arranged to be engaged when the reverse gear ratio has been realized to cancel the communication between the hydraulic pressure source and the fourth engagement element when interlocking of the transmission mechanism has occurred,
the means for supplying the hydraulic pressure is the valve of the plurality of valves, and
the valve of the plurality of valves is brought to a position to permit communication between the hydraulic pressure source and the fourth engagement element due to applied hydraulic pressure which acts when the reverse gear ratio has been realized.

11. The hydraulic pressure control apparatus for an automatic transmission according to claim 10, wherein the valve of the plurality of valves is structured such that the hydraulic pressure arranged to be applied to the third engagement element is applied to the valve of the plurality of valves from at least one direction and spring force is exerted on the valve of the plurality of valves from another direction, and
the valve of the plurality of valves is operated when the hydraulic pressure arranged to be applied to the third engagement element is raised to a level higher than the spring force.

12. The hydraulic pressure control apparatus for an automatic transmission according to claim 1, wherein
communication is inhibited when the forward gear ratio has been realized incorporates the first pattern having combinations of two engagement elements and a second pattern having combinations of three engagement elements, and
the plurality of valves incorporate first-pattern inhibiting valves for inhibiting the first pattern and second-pattern inhibiting valves for inhibiting the second pattern.

13. The hydraulic pressure control apparatus for an automatic transmission according to claim 12, wherein
the first-pattern inhibiting valves incorporate a first valve structured such that the hydraulic pressure is applied to at least the second engagement element, the third engagement element and the fifth engagement element and the fourth engagement element is drained.

14. The hydraulic pressure control apparatus for an automatic transmission according to claim 12, wherein
the second-pattern inhibiting valves incorporate a second valve structured such that the hydraulic pressure is applied to at least the first engagement element or the second engagement element, the third engagement element, and the fifth engagement element, and the first engagement element or the second engagement element is drained.

15. The hydraulic pressure control apparatus for an automatic transmission according to claim 14, wherein
the second valve incorporates a common pressure-receiving portion to which the hydraulic pressure arranged to be applied to the third engagement element and the fifth engagement element is applied, and
a third valve is provided for selectively applying, to the common pressure-receiving portion, the hydraulic pressure arranged to be applied to the third engagement element and the fifth engagement element.

16. The hydraulic pressure control apparatus for an automatic transmission according to claim 12, wherein the second-pattern inhibiting valves incorporate a fourth valve and a fifth valve corresponding to the combinations.

17. The hydraulic pressure control apparatus for an automatic transmission according to claim 13, wherein the plurality of valves are valves which use the hydraulic pressure arranged to be applied to one engagement element to drain the hydraulic pressure arranged to be applied to another engagement element, a valve of the plurality of valves is structured such that the hydraulic pressure is applied to the other engagement element from one direction together with the hydraulic pressure arranged to be applied to the engagement elements and arranged to be operated when the hydraulic pressure arranged to be applied to the other engagement element has been applied together with the hydraulic pressure arranged to the engagement element.

18. The hydraulic pressure control apparatus for an automatic transmission according to claim 14, wherein the plurality of valves are valves which use the hydraulic pressure arranged to be applied to one engagement element to drain the hydraulic pressure arranged to be applied to another engagement element, a valve of the plurality of valves is structured such that the hydraulic pressure is applied to the other engagement element from one direction together with the hydraulic pressure arranged to be applied to the engagement elements and arranged to be operated when the hydraulic pressure arranged to be applied to the other engagement applied together with the hydraulic pressure arranged to the engagement element.

19. The hydraulic pressure control apparatus for an automatic transmission according to claim 13, wherein the plurality of valves are valves which use the hydraulic pressure arranged to be applied to the engagement elements to drain the hydraulic pressure arranged to be applied to another engagement element, and a valve of the plurality of valves is structured such that only the hydraulic pressure arranged to be applied to the engagement element from one direction and arranged to be operated when the hydraulic pressure has been applied to the engagement element.

20. The hydraulic pressure control apparatus for an automatic transmission according to claim 14, wherein the plurality of valves are valves which use the hydraulic pressure arranged to be applied to the engagement elements to drain the hydraulic pressure arranged to be applied to another engagement element, and a valve of the plurality of valves is structured such that only the hydraulic pressure arranged to be applied to the engagement element from one direction and arranged to be operated when the hydraulic pressure has been applied to the engagement element.

21. The hydraulic pressure control apparatus for an automatic transmission according to claim 1, wherein a hydraulic pressure servo for operating each of the engagement elements incorporates a cylinder, a piston hermetically accommodated in the cylinder and a return spring disposed opposite to the operation of the piston, the hydraulic pressure level corresponding to the load of the return spring is made to be the same among the engagement elements, and a valve of the plurality of valves is operated when the hydraulic pressure applied to at least one engagement element is raised to a level not lower than the hydraulic pressure corresponding to the load of the return spring.

22. The hydraulic pressure control apparatus for an automatic transmission according to claim 12, wherein a hydraulic pressure servo for operating each of the engagement elements incorporates a cylinder, a piston hermetically accommodated in the cylinder and a return spring disposed opposite to the operation of piston, the hydraulic pressure level corresponding to the load of the return spring is made to be the same among the engagement elements, and a valve of the plurality of valves is operated when the hydraulic pressure applied to at least one engagement element is raised to a level not lower than the hydraulic pressure corresponding to the load of the return spring.

23. The hydraulic pressure control apparatus for an automatic transmission according to claim 22, wherein a valve of the plurality of valves is structured such that a spring force is exerted on the valve of the plurality of valves from at least an opposite direction and also structured such that balance is kept with the applied hydraulic pressure which is applied to the engagement element from at least one direction, and the spring force is a load corresponding to the hydraulic pressure of the return spring of the engagement element.

24. The hydraulic pressure control apparatus for an automatic transmission according to claim 21, wherein a valve of the plurality of valves is structured such that a spring force is exerted on the valve of the plurality of valves from at least an opposite direction and also structured such that balance is kept with the applied hydraulic pressure which is applied to the engagement element from at least one direction, and the spring force is a load corresponding to the hydraulic pressure of the return spring of the engagement element.

25. The hydraulic pressure control apparatus for an automatic transmission according to claim 17, wherein the plurality of valves are applied with a spring force and a line pressure from an opposite direction, and a valve of the plurality of valves is shifted to a position at which the hydraulic pressure arranged to be applied to the other engagement element is drained when either of the engagement elements is in an engaged state and the hydraulic pressure arranged to be applied to the other engagement element is raised to a level not lower than the spring force.

26. The hydraulic pressure control apparatus for an automatic transmission according to claim 19, wherein the plurality of valves are applied with a spring force and a line pressure from an opposite direction, and a valve of the plurality of valves is shifted to a position at which the hydraulic pressure arranged to be applied to the other engagement element is drained when either of the engagement elements is in an engaged state and the hydraulic pressure arranged to be applied to the other engagement element is raised to a level not lower than the spring force.

27. The hydraulic pressure control apparatus for an automatic transmission according to claim 17, wherein the valve of the plurality of valves is applied with only the line pressure from the other direction.

28. The hydraulic pressure control apparatus for an automatic transmission according to claim 19, wherein the valve of the plurality of valves is applied with only the line pressure from the other direction.

29. The hydraulic pressure control apparatus for an automatic transmission according to claim 19, wherein the plurality of valves are applied with only the spring force from the other direction.

30. The hydraulic pressure control apparatus for an automatic transmission according to claim 21, wherein the plurality of valves are applied with only the spring force from the other direction.

31. The hydraulic pressure control apparatus for an automatic transmission according to claim 13, wherein the fifth engagement element is provided for engine brake, a sixth engagement element is disposed in parallel with the fifth engagement element and in series with a one-way clutch, and the first pattern further incorporates a combination of the fourth engagement element and the sixth engagement element.

32. The hydraulic pressure control apparatus for an automatic transmission according to claim 31, wherein the first valve structured such that the hydraulic pressure arranged to be applied to the sixth engagement element is applied to the first valve together with the hydraulic pressure arranged to be applied to the second engagement element, the third engagement element and the fifth engagement element and arranged to use the hydraulic pressure arranged to be applied to at least one engagement element to drain the fourth engagement element, and the sixth engagement element is always maintained at a state of engagement with the second speed to the sixth speed.

33. The hydraulic pressure control apparatus for an automatic transmission according to claim 1, further comprising:

pressure regulating means for regulating the hydraulic pressure applied from a hydraulic pressure source, wherein the hydraulic pressure applied from the pressure regulating means is applied to a hydraulic pressure servo which operates each engagement element, and a valve of the plurality of valves is disposed between the hydraulic pressure source and the pressure regulating means.

34. The hydraulic pressure control apparatus for an automatic transmission according to claim 12, further comprising:

pressure regulating means for regulating the hydraulic pressure applied from a hydraulic pressure source, wherein the hydraulic pressure applied from the pressure regulating means is applied to a hydraulic pressure servo which operates each engagement element, and a valve of the plurality of valves is disposed between the hydraulic pressure source and the pressure regulating means.

35. The hydraulic pressure control apparatus for an automatic transmission according to claim 33, wherein the plurality of valves are structured such that the hydraulic pressure between each valve of the plurality of valves and the pressure regulating means is applied to a valve of the plurality of valves from one direction and as well as structured such that the hydraulic pressure is applied when the valve of the plurality of valves is at a first position and the hydraulic pressure is drained when the valve of the plurality of valves is at a second position.

36. The hydraulic pressure control apparatus for an automatic transmission according to claim 35, wherein the valve of the plurality of valves is applied with the hydraulic pressure from the hydraulic pressure source from another direction when the valve of the plurality of valves is at the second position.

\* \* \* \* \*